United States Patent
Haneda et al.

(10) Patent No.: US 10,535,108 B2
(45) Date of Patent: Jan. 14, 2020

(54) TRANSACTION MANAGEMENT SYSTEM, TRANSACTION MANAGEMENT METHOD AND PROGRAM

(71) Applicant: HONDA MOTOR CO., LTD., Tokyo (JP)

(72) Inventors: Satoshi Haneda, Saitama (JP); Chieko Sou, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/175,810

(22) Filed: Oct. 30, 2018

(65) Prior Publication Data

US 2019/0066237 A1 Feb. 28, 2019

Related U.S. Application Data

(63) Continuation of application No. PCT/JP2017/033781, filed on Sep. 19, 2017.

(30) Foreign Application Priority Data

Sep. 20, 2016 (JP) .................. 2016-183544

(51) Int. Cl.
*G06Q 50/06* (2012.01)
*B60L 53/66* (2019.01)
(Continued)

(52) U.S. Cl.
CPC .............. *G06Q 50/06* (2013.01); *B60L 53/65* (2019.02); *B60L 53/665* (2019.02);
(Continued)

(58) Field of Classification Search
CPC ..................................................... G06Q 50/06
See application file for complete search history.

(56) References Cited

U.S. PATENT DOCUMENTS 9,160,182 B2 * 10/2015 Keating ................. H02J 7/025
2001/0014869 A1   8/2001 Yoshizawa
(Continued)

FOREIGN PATENT DOCUMENTS

JP   2001160109 A   6/2001
JP   2008250837 A   10/2008
(Continued)

OTHER PUBLICATIONS

Notification of Reasons for Refusal issued for counterpart Japanese Application 2016-183544, drafted by the Japan Patent Office on Jul. 11, 2017.
(Continued)

*Primary Examiner* — Jacob C. Coppola

(57) ABSTRACT

A power feeding management apparatus includes: a power feeding side identification information acquiring unit that acquires power feeding side identification information for identifying the power feeding side from a device or a user's communication terminal in the power feeding side; a power receiving side identification information acquiring unit that acquires power receiving side identification information for identifying the power receiving side from a device or a user's communication terminal in the power receiving side; a power feeding information acquiring unit that acquires power feeding information about a power amount fed from the device in the power feeding side or a power amount fed to the device in the power receiving side; and a transmission unit that associates with one another: the power feeding side identification information; the power receiving side identification information; and the power feeding information, and transmits them to a transaction management apparatus.

10 Claims, 12 Drawing Sheets

(51) Int. Cl.
*G06Q 10/06* (2012.01)
*H02J 7/00* (2006.01)
*G07F 15/00* (2006.01)
*G06Q 20/32* (2012.01)
*B60L 53/65* (2019.01)
*G06Q 20/18* (2012.01)
*G06Q 20/20* (2012.01)
*G06Q 20/38* (2012.01)
*H04L 29/06* (2006.01)
*H02J 3/00* (2006.01)
*H04L 9/08* (2006.01)

(52) U.S. Cl.
CPC ......... *G06Q 10/0631* (2013.01); *G06Q 20/18* (2013.01); *G06Q 20/206* (2013.01); *G06Q 20/322* (2013.01); *G06Q 20/327* (2013.01); *G06Q 20/3829* (2013.01); *G07F 15/005* (2013.01); *H02J 7/0027* (2013.01); *H04L 63/0428* (2013.01); *G06Q 2220/00* (2013.01); *H02J 3/008* (2013.01); *H02J 7/0054* (2013.01); *H02J 2007/0001* (2013.01); *H04L 9/0894* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2009/0021218 | A1* | 1/2009 | Kelty | B60L 3/0092 320/137 |
| 2010/0271226 | A1* | 10/2010 | Holbery | G01D 4/002 340/657 |
| 2011/0185303 | A1* | 7/2011 | Katagi | G06Q 30/04 715/771 |
| 2011/0202192 | A1 | 8/2011 | Kempton | |
| 2012/0146582 | A1 | 6/2012 | Lei | |
| 2012/0166011 | A1 | 6/2012 | Oba | |
| 2012/0245870 | A1 | 9/2012 | Komano | |
| 2012/0296836 | A1 | 11/2012 | Hisano | |
| 2013/0154562 | A1 | 6/2013 | Szostek | |
| 2015/0229151 | A1* | 8/2015 | Sudan | H02J 7/0072 320/137 |
| 2016/0031339 | A1 | 2/2016 | Geo | |
| 2016/0068075 | A1 | 3/2016 | Chen | |
| 2016/0225104 | A1 | 8/2016 | Yamaguchi | |
| 2019/0054836 | A1* | 2/2019 | Haneda | B60L 55/00 |

FOREIGN PATENT DOCUMENTS

| | | |
|---|---|---|
| JP | 2011164700 A | 8/2011 |
| JP | 2011188588 A | 9/2011 |
| JP | 2012200094 A | 10/2012 |
| JP | 5459074 B2 | 4/2014 |
| JP | 2014149611 A | 8/2014 |
| JP | 2015075820 A | 4/2015 |

OTHER PUBLICATIONS

Decision to Grant a Patent issued for counterpart Japanese Application 2016-183544, drafted by the Japan Patent Office on Oct. 3, 2017.

International Search Report for International Patent Application No. PCT/JP2017/033781, mailed by European Patent Office dated Dec. 12, 2017.

Office Action issued for counterpart Taiwanese Application No. 106131900, issued by the Taiwan Intellectual Property Office dated Sep. 28, 2018.

* cited by examiner

TRANSACTION MANAGEMENT SYSTEM, TRANSACTION MANAGEMENT METHOD AND PROGRAM

CROSS REFERENCE TO RELATED APPLICATIONS

This is a continuation application of International Application No. PCT/JP2017/033781, filed on Sep. 19, 2017, which claims priority to Japanese Patent Application No. 2016-183544, filed on Sep. 20, 2016, the contents of each of which are incorporated herein by reference.

BACKGROUND

1. Technical Field

The present invention relates to a transaction management system, a transaction management method and a program.

2. Related Art

A charging cable is known which is used for charging an electric vehicle (for example, refer to Patent Documents 1 to 2).
Patent Document 1: Japanese Patent Application Publication No. 2011-188588
Patent Document 2: Japanese Patent No. 5459074

SUMMARY

For a broader use of electric vehicles and the like, it is desired to improve convenience or reliability of a power transaction.

In a first aspect of the present invention provided is a transaction management system. The transaction management system described above includes, for example, a power feeding management apparatus that manages a power feeding from a power feeding side to a power receiving side. The transaction management system described above includes, for example, a transaction management apparatus that manages a power transaction between a power feeding side and a power receiving side. In the transaction management system described above, the power feeding management apparatus may include a power feeding side identification information acquiring unit that acquires power feeding side identification information for identifying the power feeding side from a device in the power feeding side or a user's communication terminal in the power feeding side. In the transaction management system described above, the power feeding management apparatus may include a power receiving side identification information acquiring unit that acquires power receiving side identification information for identifying the power receiving side from a device in the power receiving side or a user's communication terminal in the power receiving side. In the transaction management system described above, the power feeding management apparatus may include a power feeding information acquiring unit that acquires power feeding information about a power amount fed from the device in the power feeding side or a power amount fed to the device in the power receiving side. In the transaction management system described above, the power feeding management apparatus may include a transmission unit that associates with one another: the power feeding side identification information acquired by the power feeding side identification information acquiring unit; the power receiving side identification information acquired by the power receiving side identification information acquiring unit; and the power feeding information acquired by the power feeding information acquiring unit, and transmits them to the transaction management apparatus that manages the power feeding side identification information, the power receiving side identification information and the power feeding information. In the transaction management system described above, the transaction management apparatus may include a transaction information acquiring unit that acquires, from the transmission unit via a communication network, transaction information in which the power feeding side identification information, the power receiving side identification information and the power feeding information are associated with one another. In the transaction management system described above, the transaction management apparatus may include a transaction information storage unit that stores the transaction information acquired by the transaction information acquiring unit.

In a second aspect of the present invention provided is a transaction management system. The transaction management system described above includes, for example, a transaction management apparatus that manages a power transaction between a power feeding side and a power receiving side. In the transaction management system described above, the transaction management apparatus may include a transaction information acquiring unit that acquires transaction information in which: (a) power feeding side identification information for identifying the power feeding side; (b) power receiving side identification information for identifying the power receiving side; and (c) power feeding information about a power amount fed from a device in the power feeding side or a power amount fed to a device in the power receiving side are associated with one another, from at least one of: (i) a power feeding management apparatus that manages a power feeding from the power feeding side to the power receiving side; (ii) the device in the power feeding side, (iii) a user's communication terminal in the power feeding side, (iv) the device in the power receiving side, and (v) a user's communication terminal in the power receiving side, via a communication network. In the transaction management system described above, the transaction management apparatus may include a transaction information storage unit that stores the transaction information acquired by the transaction information acquiring unit.

In the transaction management system according to the first and the second aspects described above, the transaction information acquiring unit may acquire first transaction information in which the power feeding side identification information is associated with the power feeding information, from the device in the power feeding side or the user's communication terminal in the power feeding side via the communication network. In the transaction management system described above, the transaction information acquiring unit may acquire second transaction information in which the power receiving side identification information is associated with the power feeding information, from the device in the power receiving side or the user's communication terminal in the power receiving side via the communication network. In the transaction management system described above, the transaction management apparatus may include a comparison unit that compares a power amount indicated by the first transaction information with a power amount indicated by the second transaction information.

In the transaction management system according to the first and the second aspects described above, the transaction management apparatus may include an intermediation unit that intermediates in the power transaction between the power receiving side and the power feeding side. In the transaction management system described above, the transaction management apparatus may include an agreement information generating unit that generates agreement information including at least one of the power feeding side identification information and the power receiving side identification information, if the power transaction in which the intermediation unit intermediates reaches an agreement. In the transaction management system described above, the transaction management apparatus may include an encryption unit that encrypts the agreement information by using a third encryption key that corresponds to a third decryption key stored in the power feeding management apparatus.

In the transaction management system according to the first and the second aspects described above, the transaction management apparatus may include: an authentication information acquiring unit that acquires information in which (a) at least one of: measuring unit identification information and power feeding management apparatus identification information is associated with (b) authentication information, from at least one of: (i) the power feeding management apparatus that manages the power feeding from the power feeding side to the power receiving side; (ii) the device in the power feeding side, (iii) the user's communication terminal in the power feeding side, (iv) the device in the power receiving side, and (v) the user's communication terminal in the power receiving side, via the communication network, the measuring unit identification information for identifying a measuring unit that measures a physical amount related to a power amount fed from the device in the power feeding side or a power amount fed to the device in the power receiving side, the power feeding management apparatus identification information for identifying the power feeding management apparatus, and the authentication information including at least one of characteristic information indicating a characteristic of the measuring unit and a passphrase used for authentication of the measuring unit or the power feeding management apparatus. In the transaction management system described above, the transaction management apparatus may include an authentication information storage unit that stores in advance (a) at least one of the measuring unit identification information and the power feeding management apparatus identification information and (b) the authentication information such that they are associated with each other. In the transaction management system described above, the transaction management apparatus may include a power feeding management apparatus authentication unit that verifies the authentication information acquired by the authentication information acquiring unit with the authentication information stored in the authentication information storage unit in advance, and that authenticates the measuring unit or the power feeding management apparatus if the acquired authentication information matches the stored authentication information.

In the transaction management system described above, the authentication information may be encrypted. In the transaction management system described above, the transaction management apparatus may include a first decryption key storage unit that stores a first decryption key corresponding to a first encryption key used for encrypting the authentication information. In the transaction management system described above, the transaction management apparatus may include a first decryption unit that decrypts the encrypted authentication information by using the first decryption key stored in the decryption key storage unit.

In the transaction management system according to the first and the second aspects described above, the transaction information may be encrypted. In the transaction management system described above, the transaction management apparatus may include a second decryption key storage unit that stores a second decryption key corresponding to a second encryption key used for encrypting the transaction information. In the transaction management system described above, the transaction management apparatus may include a second decryption unit that decrypts the encrypted transaction information by using the second decryption key stored in the decryption key storage unit. In the transaction management system described above, the transaction management apparatus may include a settlement unit that settles a charge of the power transaction.

In a third aspect of the present invention, provided is a program for causing a computer to function as the transaction management system described above. A non-transitory computer readable medium may also be provided for storing the program described above.

In a fourth aspect of the present invention, provided is a transaction management method for managing a power transaction between a power feeding side and a power receiving side. The transaction management method described above includes, for example, a transaction information acquiring step of acquiring transaction information in which: (a) power feeding side identification information for identifying the power feeding side; (b) power receiving side identification information for identifying the power receiving side; and (c) power feeding information about a power amount fed from a device in the power feeding side or a power amount fed to a device in the power receiving side are associated with one another, from at least one of: (i) a power feeding management apparatus that manages a power feeding from the power feeding side to the power receiving side; (ii) the device in the power feeding side, (iii) a user's communication terminal in the power feeding side, (iv) the device in the power receiving side, and (v) a user's communication terminal in the power receiving side, via a communication network. The transaction management method described above includes a transaction information storage step for storing the transaction information acquired in the transaction information acquiring step.

The summary clause does not necessarily describe all necessary features of the embodiments of the present invention. The present invention may also be a sub-combination of the features described above.

DESCRIPTION OF EXEMPLARY EMBODIMENTS

Figure 1:
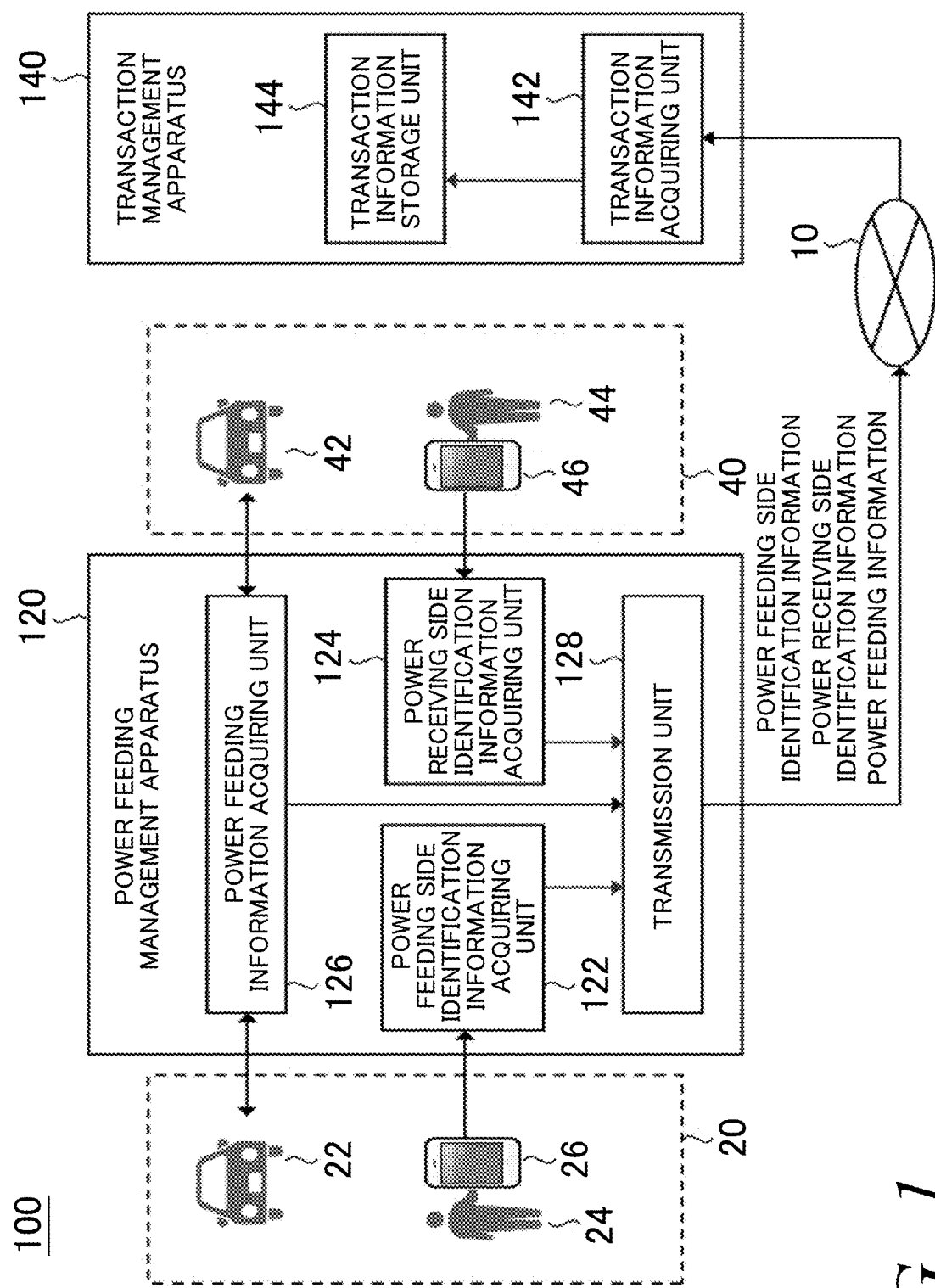
FIG. 1 schematically illustrates one example of a system configuration of a transaction management system 100.

Hereinafter, the present invention is described through the embodiments of the invention. However, the following embodiments do not limit the claimed invention. Also, all of combinations of features described in the embodiments are not necessarily required for a means for solving problems of the invention. Note that in the drawings, the same reference numerals may be applied to the same or similar portions and the redundant descriptions may be omitted.

[Summary of Transaction Management System 100]

FIG. 1 schematically illustrates one example of a system configuration of a transaction management system 100. In the present embodiment, the transaction management system 100 includes a power feeding management apparatus 120 and a transaction management apparatus 140. In the present embodiment, the power feeding management apparatus 120 includes a power feeding side identification information acquiring unit 122, a power receiving side identification information acquiring unit 124, a power feeding information acquiring unit 126, and a transmission unit 128. In the present embodiment, the transaction management apparatus 140 includes a transaction information acquiring unit 142 and a transaction information storage unit 144. In accordance with the present embodiment, the power feeding management apparatus 120 and the transaction management apparatus 140 can transmit and receive information via a communication network 10.

The communication network 10 may be a transmission path for wired communication, may be a transmission path for wireless communication, or may be a combination of a transmission path for wireless communication and a transmission path for wired communication. The communication network 10 may also include a wireless packet communication network, the Internet, a P2P network, a dedicated line, a VPN and the like. The communication network 10 may include a mobile communication network such as a cellular phone network, or may include a wireless communication network such as a wireless MAN (for example, WiMAX (registered trademark)), a wireless LAN (for example, WiFi (registered trademark)), Bluetooth (registered trademark), Zigbee (registered trademark), NFC (Near Field Communication).

In the present embodiment, the transaction management system 100 manages a power transaction between a power feeding side 20 and a power receiving side 40. Also, it manages a power feeding from the power feeding side 20 to the power receiving side 40. In the present embodiment, for the purpose of ease of understandings, the transaction management system 100 is described using an exemplary case for feeding a power from power feeding equipment mounted on a vehicle 22 in the power feeding side 20 to a vehicle 42 in the power receiving side 40 to charge a power storage apparatus of the vehicle 42.

The power feeding equipment mounted on the vehicle 22 may be illustrated as a power storage apparatus, a charging apparatus, a power generation apparatus and the like. The power generation apparatus may be illustrated as: (i) an alternator which generates a power by using an internal combustion; (ii) a fuel cell; and (iii) a power generation system using natural sources such as a photovoltaic apparatus, and the like. The power feeding equipment may be in-vehicle equipment incorporated in the vehicle 22, or may be portable equipment which can be mounted on the vehicle 22.

The vehicle 22 may be one example of the device in the power feeding side. The vehicle 22 may be one example of the first movable object. The power feeding equipment may be one example of the device in the power feeding side. A user 24 may be one example of the user in the power feeding side. The communication terminal 26 may be one example of the user's communication terminal in the power feeding side. The vehicle 42 may be one example of the device in the power receiving side. The vehicle 42 may be one example of the second movable object. The power storage apparatus of the vehicle 42 may be one example of the device in the power receiving side. A user 44 may be one example of the user in the power receiving side. The communication terminal 46 may be one example of the user's communication terminal in the power receiving side.

In the present embodiment, the vehicle 22 and the vehicle 42 may transmit information to and receive information from the power feeding management apparatus 120, through a near field communication or a wired communication. The vehicle 22 and the vehicle 42 may also transmit information to and receive information from the communication terminal 26 and the communication terminal 46, respectively, through the near field communication or the wired communication. The near field communication may be illustrated as a wireless MAN (for example, WiMAX (registered trademark)), a wireless LAN (for example, WiFi (registered trademark)), Bluetooth (registered trademark), Zigbee (registered trademark), NFC (Near Field Communication), and the like.

The vehicle 22 and the vehicle 42 may also have a mobile communication function. In this case, the vehicle 22 and the vehicle 42 may also transmit information to and receive information from the transaction management apparatus 140 via the communication network 10. Also, the vehicle 22 and the vehicle 42 may also transmit information to and receive information from each other via the communication network 10.

In the present embodiment, the communication terminal 26 and the communication terminal 46 transmit information to and receive information from the transaction management apparatus 140 via the communication network 10. The communication terminal 26 and the communication terminal 46 may also transmit information to and receive information from each other via the communication network 10. The communication terminal 26 and the communication terminal 46 may also transmit information to and receive information from the vehicle 22 and the vehicle 42, respectively, through the near field communication or the wired communication. The communication terminal 26 and the communication terminal 46 may also transmit information to and receive information from the power feeding management apparatus 120 through the near field communication or the wired communication.

The communication terminal 26 and the communication terminal 46 may be illustrated as a personal computer, a mobile terminal and the like. The mobile terminal may be illustrated as a cellular phone, a smart phone, a PDA, a tablet, a notebook computer or a laptop computer, a wearable computer and the like. In one embodiment, the communication terminal 26 and the communication terminal 46 are implemented by installing a program for the power feeding side 20 and a program for the power receiving side 40, respectively, in information processing apparatuses. In another embodiment, the communication terminal 26 and the communication terminal 46 may be implemented by installing a program having both functions for the power feeding side 20 and for the power receiving side 40 in information processing apparatuses.

[Description of Each Unit of Transaction Management System 100]

In the present embodiment, the power feeding management apparatus 120 manages a power feeding from the power feeding side 20 to the power receiving side 40. In the present embodiment, the power feeding side identification information acquiring unit 122 acquires power feeding side identification information (which may be referred to as a power feeding side ID) for identifying the power feeding side 20 from the vehicle 22 or the communication terminal 26. The power feeding side ID may be illustrated as identification information of the vehicle 22, identification information of the user 24, identification information of the communication terminal 26 and the like. The identification information of the vehicle 22 may be information for identifying the vehicle 22 per se, or may be information for identifying the apparatus mounted on the vehicle 22.

In one embodiment, the power feeding side identification information acquiring unit 122 acquires the power feeding side ID from the vehicle 22 or the communication terminal 26 through the near field communication. In another embodiment, the power feeding side identification information acquiring unit 122 acquires the power feeding side ID from the vehicle 22 or the communication terminal 26 through the wired communication. A system of the wired communication may be illustrated as: a system for connecting the communication terminal 26 to a communication connector provided with the power feeding management apparatus 120; a system for connecting the vehicle 22 or the communication terminal 26 to a communication cable connected to the power feeding management apparatus 120; and a power line communication system for connecting the vehicle 22 or the communication terminal 26 to a charging cable connected to the power feeding management apparatus 120, and the like.

In the present embodiment, the power receiving side identification information acquiring unit 124 acquires power receiving side identification information (which may be referred to as a power receiving side ID) for identifying the power receiving side 40 from the vehicle 42 or the communication terminal 46. The power receiving side ID may be illustrated as identification information of the vehicle 42, identification information of the user 44, identification information of the communication terminal 46 and the like. The identification information of the vehicle 42 may be information for identifying the vehicle 42 per se, or may be information for identifying the apparatus mounted on the vehicle 42. The power receiving side identification information acquiring unit 124 may acquire the power receiving side ID in a manner similar to the manner in which the power feeding side identification information acquiring unit 122 acquires the power feeding side ID.

In the present embodiment, the power feeding information acquiring unit 126 acquires power feeding information about a power amount fed from the vehicle 22 or a power amount fed to the vehicle 42. The power feeding information may also include information about the power amount fed from the vehicle 22 and information about the power amount fed to the vehicle 42. The power feeding information may be illustrated as information indicating: the power amount per se, fed from the vehicle 22; the power amount per se, fed to the vehicle 42; an integrated value of currents flowing from the vehicle 22 to the vehicle 42; a decrease in amount of SOC in the power storage apparatus of the vehicle 22; an increase in amount of SOC in the power storage apparatus of the vehicle 42; a starting time of power feeding; an ending time of power feeding; and a statistical value (for example, a maximum value, a minimum value, a median value, an average value and the like) for at least one of currents and voltages during power feeding, and the like. The power feeding information may also include: information (for example, a model, a serial number and the like of the charging cable) for identifying an instrument used for power feeding or a type thereof; and information about an external environment during power feeding (for example, information indicating a temperature, a humidity and the like), and the like.

In the present embodiment, the transmission unit 128 transmits each type of information from the power feeding management apparatus 120 to the transaction management apparatus 140. For example, the transmission unit 128 associates with one another: the power feeding side ID acquired by the power feeding side identification information acquiring unit 122; the power receiving side ID acquired by the power receiving side identification information acquiring unit 124; and the power feeding information acquired by the power feeding information acquiring unit 126, and transmits them to the transaction management apparatus 140. The method of associating with one another: the power feeding ID; the power receiving ID; and the power feeding information, is not particularly limited.

Although a communication path and a communication system for the information described above are not particularly limited, in one embodiment, the transmission unit 128 transmits the information to the transaction management apparatus 140 by using the communication network 10, via at least one of the vehicle 22, the communication terminal 26, the vehicle 42 and the communication terminal 46. In another embodiment, the transmission unit 128 may transmit the information to the transaction management apparatus 140 by using the communication network 10, not via the vehicle 22, the communication terminal 26 the vehicle 42 or the communication terminal 46.

In the present embodiment, the transaction management apparatus 140 manages a power transaction between the power feeding side 20 and the power receiving side 40. The transaction management apparatus 140 may also manage the power feeding side ID, the power receiving side ID and the power feeding information. In the present embodiment, the transaction information acquiring unit 142 acquires transaction information in which the power feeding side ID, the power receiving side ID and the power feeding information are associated with one another. The transaction information acquiring unit 142 acquires the transaction information in which the power feeding side ID, the power receiving side ID and the power feeding information are associated with one another, for example, from at least one of the power feeding management apparatus 120, the vehicle 22, the communication terminal 26, the vehicle 42, and the communication terminal 46, via the communication network 10. In the present embodiment, the transaction information storage unit 144 stores the transaction information acquired by the transaction information acquiring unit 142.

In one embodiment, the transaction information acquiring unit 142 receives the transaction information which includes the power feeding side ID, the power receiving side ID and the power feeding information, from at least one of the power feeding management apparatus 120, the vehicle 22, the communication terminal 26, the vehicle 42, and the communication terminal 46. The transaction information may include at least one of information indicating a position at which power feeding is performed and information indicating a time at which power feeding is performed.

In another embodiment, the transaction information acquiring unit 142 acquires a plurality of pieces of information from at least one of the power feeding management apparatus 120, the vehicle 22, the communication terminal 26, the vehicle 42, and the communication terminal 46. The transaction information acquiring unit 142 may also acquire a plurality of pieces of information from at least two of the power feeding management apparatus 120, the vehicle 22, the communication terminal 26, the vehicle 42, and the communication terminal 46. Each of a plurality of pieces of information includes at least one of the power feeding side ID, the power receiving side ID and the power feeding information. At least one of a plurality of pieces of information may include at least one of information indicating a position at which power feeding is performed and information indicating a time at which power feeding is performed. Also, as the power feeding side ID, the power receiving side ID and the power feeding information are associated with one another, the transaction information acquiring unit 142 can acquire the transaction information in which the power feeding side ID, the power receiving side ID and the power feeding information are associated with one another, by processing the received information as appropriate.

For example, the transaction information acquiring unit 142 receives, from the vehicle 22 or the communication terminal 26, first information which includes a transaction ID for identifying the power transaction, the power feeding side ID and the power feeding information, and receives, from the vehicle 42 or the communication terminal 46, second information which includes the transaction ID and the power receiving side ID. The transaction information acquiring unit 142 integrates the first information and the second information, by using the transaction IDs as a key, to acquire the transaction information. In the embodiment described above, the second information may also include the power feeding side ID, instead of the transaction ID or together with the transaction ID. The second information may also include the power feeding information. If the first information and the second information both include the power feeding information, the power feeding information included in the first information and the power feeding information included in the second information can be compared, thereby improving reliability of the transaction.

As described above, in accordance with the present embodiment, the power feeding management apparatus 120 which manages the power feeding from the power feeding side 20 to the power receiving side 40 associates with one another: the power feeding side ID; the power receiving side ID; and the power feeding information, and transmits them to the transaction management apparatus 140. This allows the transaction management apparatus 140 to acquire the transaction information in which the power feeding side ID, the power receiving side ID and the power feeding information are associated with one another. This allows the transaction management system 100 to accumulate the history of the power transactions. As a result, the transaction management system 100 can manage the overall power transaction from an intermediation to a settlement. This improves convenience of the power transaction, and also facilitates a small-scale power transaction such as a transaction among individuals. Also, for example, it can suppress falsification of data related to the transaction, thereby improving reliability of the power transaction. In accordance with the present embodiment, particularly, the power transaction between movable objects can be facilitated.

In the present embodiment, the case is described in which the device in the power feeding side and the device in the power receiving side are vehicles. However, the device in the power feeding side and the device in the power receiving side are not limited to the present embodiment. In another embodiment, one of the device in the power feeding side and the device in the power receiving side may be a movable object. The movable object is not particularly limited, as long as it can move by way of a user's operation or an automated drive (which may be referred to as an automated cruise, a cruise control and the like) by a computer mounted thereon.

The movable object may be illustrated as an automobile, a motorcycle, a marine vessel, a flight vehicle and the like. The automobile may be illustrated as an engine vehicle, an electric vehicle, a fuel cell vehicle, a hybrid vehicle, a movable working machine and the like. The working machine may move automatically or manually. The working machine may be illustrated as a lawn mower, a grass cutter, a tiller, a tractor, a carrier, a pump, a sprayer, a scrubber, a snowplow and the like.

The motorcycle may be illustrated as: (i) a motorcycle; (ii) a motor three-wheeler; and (iii) a stand-up two-wheeler with a power unit such as a Segway (registered trademark), a Kickboard (registered trademark) with a power unit, and a skateboard with a power unit, and the like. The power unit may be (i) an internal combustion such as an engine and a motor, or may be (ii) a combination of a power storage apparatus or a power generation apparatus and an electric motor. The marine vessel may be illustrated as a ship, a hovercraft, a personal watercraft, a submarine, a submersible, an underwater motor scooter and the like. The flight vehicle may be illustrated as an aircraft, an airship or a balloon, a hot air balloon, a helicopter, a drone and the like.

[Specific Configuration of Each Unit of Transaction Management System 100]

Each unit of the transaction management system 100 may be implemented by hardware, may be implemented by software, or may be implemented by hardware and software. Each unit of the transaction management system 100 may be implemented by a single server, or may be implemented by a plurality of servers. Each unit of the transaction management system 100 may also store information by using a distributed ledger technology such as Blockchain or a distributed network.

If at least a part of components included in the transaction management system 100 are implemented by software, the components may be implemented in an information processing apparatus having a general configuration, by activating software or a program which defines operations related to the components. The information processing apparatus described above may include: (i) a data processing apparatus which includes a processor such as a CPU and a GPU, an ROM, an RAM, a communication interface and the like; (ii) an input apparatus such as a keyboard, a touch panel, a camera, a microphone, each type of sensors, and a GPS receiver; (iii) an output apparatus such as a display apparatus, a speaker, and a vibration apparatus; and (iv) a storage apparatus (including an external storage apparatus) such as a memory and an HDD. At least a part of the transaction management system 100 may also be implemented on a virtual server or on a cloud system.

In the information processing apparatus described above, the data processing apparatus or the storage apparatus described above may store the software or the program described above. The software or the program described above causes, by being executed by a processor, the information processing apparatus described above to execute operations defined by the software or the program. The software or the program described above may also be stored in a non-transitory computer readable recording medium.

Figure 2:
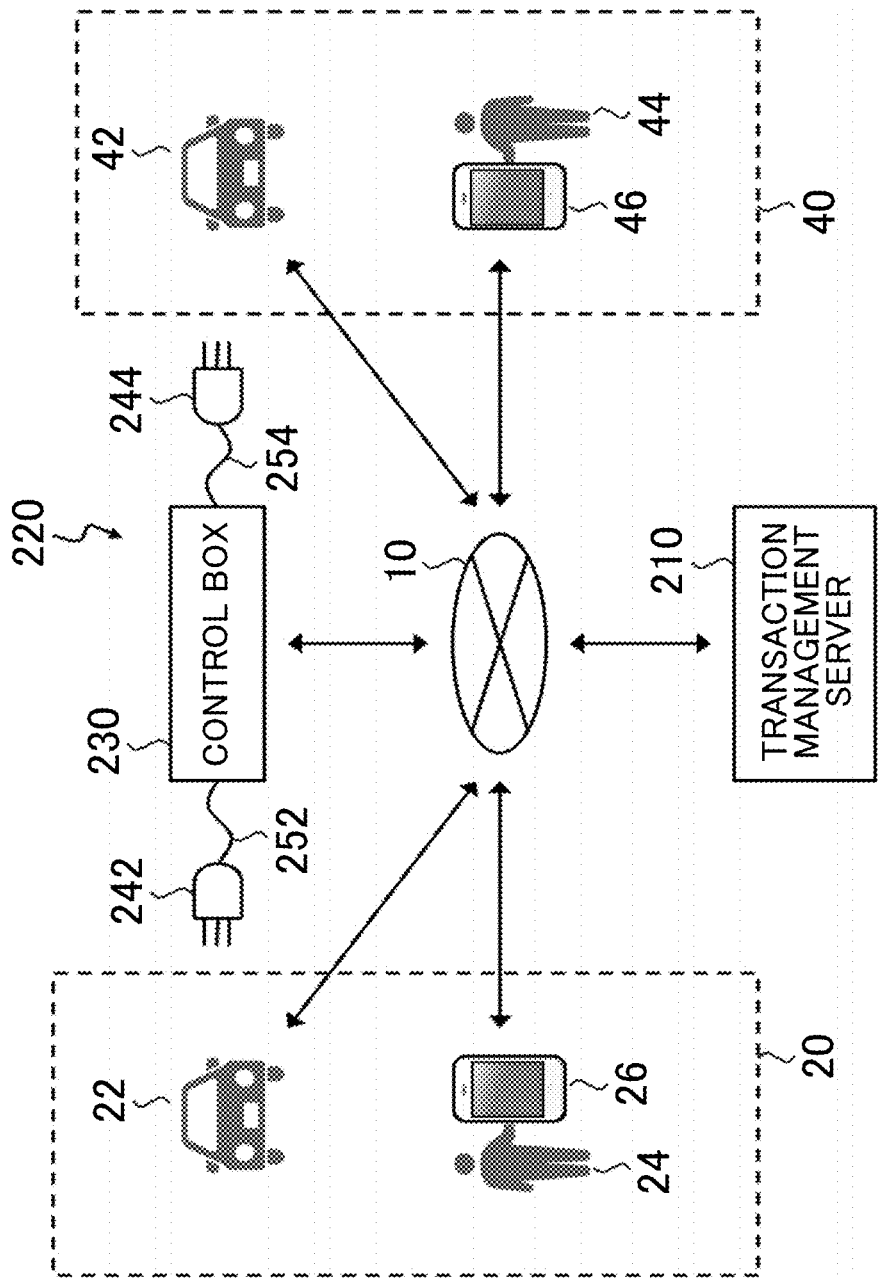
FIG. 2 schematically illustrates one example of a system configuration of a power transaction system 200.

FIG. 2 schematically illustrates one example of a system configuration of a power transaction system 200. In the present embodiment, the power transaction system 200 includes a transaction management server 210 and a charging cable 220. In the present embodiment, the charging cable 220 includes a control box 230. The charging cable 220 may also include a power feeding side connector 242, a power receiving side connector 244, a power feeding side cable 252, and a power receiving side cable 254. The transaction management server 210 may be one example of the transaction management apparatus. The charging cable 220 may be one example of the power feeding management apparatus and the charging equipment. The control box 230 may be one example of the power feeding management apparatus.

In the present embodiment, the power transaction system 200 executes: (i) an intermediation process of the power transaction; (ii) an execution management process of the power transaction; and (iii) a settlement process of the power transaction. In the present embodiment, the transaction management server 210 manages a power transaction between the power feeding side 20 and the power receiving side 40. The transaction management server 210 may have a configuration similar to that of the transaction management apparatus 140. In the present embodiment, the charging cable 220 electrically couples the vehicle 22 in the power feeding side 20 to the vehicle 42 in the power receiving side 40. The control box 230 manages the power feeding from the power feeding side 20 to the power receiving side 40. The control box 230 may have a configuration similar to that of the power feeding management apparatus 120.

The power feeding side connector 242 is electrically coupled to the vehicle 22. The power feeding side connector 242 is configured to be electrically coupled to a power source connecting terminal of the vehicle 22, for example. The power receiving side connector 244 is electrically coupled to the vehicle 42. The power receiving side connector 244 is configured to be electrically coupled to the power source connecting terminal of the vehicle 42, for example. Each of the power feeding side connector 242 and the power receiving side connector 244 may be a plug, or may be a receptacle. The power feeding side cable 252 electrically couples the power feeding side connector 242 to the control box 230. The power feeding side cable 252 electrically couples the power receiving side connector 244 to the control box 230.

As used herein, to "electrically couple" is not limited to the case in which an electric energy is transmitted through a contact system. To "Electrically couple" is a concept which also encompasses the case in which an electric energy is transmitted through a non-contact system and the case in which an electric energy is transmitted through a combination of the contact system and the non-contact system. Also, to "electrically couple" is not limited to the case in which an electric energy is transmitted between two components without any other components interposed therebetween. To "Electrically couple" is a concept which also encompasses the case in which an electric energy is transmitted between two components via other components.

In the present embodiment, the case is described in which the control box 230 is a part of the charging cable 220. However, the control box 230 is not limited to the present embodiment. In another embodiment, at least a part of the control box 230 may be provided inside an adaptor arranged between the charging cable and the vehicle 22 or the vehicle 42. In still another embodiment, at least a part of the control box 230 may be mounted on at least one of the vehicle 22 and the vehicle 42. In still another embodiment, the vehicle 22 and the vehicle 42 may also include the control boxes 230, respectively.

In the present embodiment, the case is described in which the charging cable 220, one example of the charging equipment, includes one power feeding side cable 252 and one power receiving side cable 254. However, the charging equipment is not limited to the present embodiment. In another embodiment, the charging equipment may not include at least one of the power feeding side cable and the power receiving side cable. In still another embodiment, the charging equipment may include a plurality of power feeding side connectors 242 and power feeding side cables 252. Also, the charging equipment may also include a plurality of power receiving side connectors 244 and power receiving side cables 254.

[Specific Configuration of Each Unit of Power Transaction System 200]

Each unit of the power transaction system 200 may be implemented by hardware, may be implemented by software, or may be implemented by hardware and software. Each unit of the power transaction system 200 may be implemented by a single server, or may be implemented by a plurality of servers. Each unit of the power transaction system 200 may also store information by using a distributed ledger technology such as Blockchain or a distributed network.

If at least a part of components included in the power transaction system 200 are implemented by software, the components may be implemented in an information processing apparatus having a general configuration, by activating software or a program which defines operations related to the components. The information processing apparatus described above may include: (i) a data processing apparatus which includes a processor such as a CPU and a GPU, an ROM, an RAM, a communication interface and the like; (ii) an input apparatus such as a keyboard, a touch panel, a camera, a microphone, each type of sensors, and a GPS receiver; (iii) an output apparatus such as a display apparatus, a speaker, and a vibration apparatus; and (iv) a storage apparatus (including an external storage apparatus) such as a memory and an HDD. At least a part of the power transaction system 200 may also be implemented on a virtual server or on a cloud system.

In the information processing apparatus described above, the data processing apparatus or the storage apparatus described above may store the software or the program described above. The software or the program described above causes, by being executed by a processor, the information processing apparatus described above to execute operations defined by the software or the program. The software or the program described above may also be stored in a non-transitory computer readable recording medium.

Figure 3:
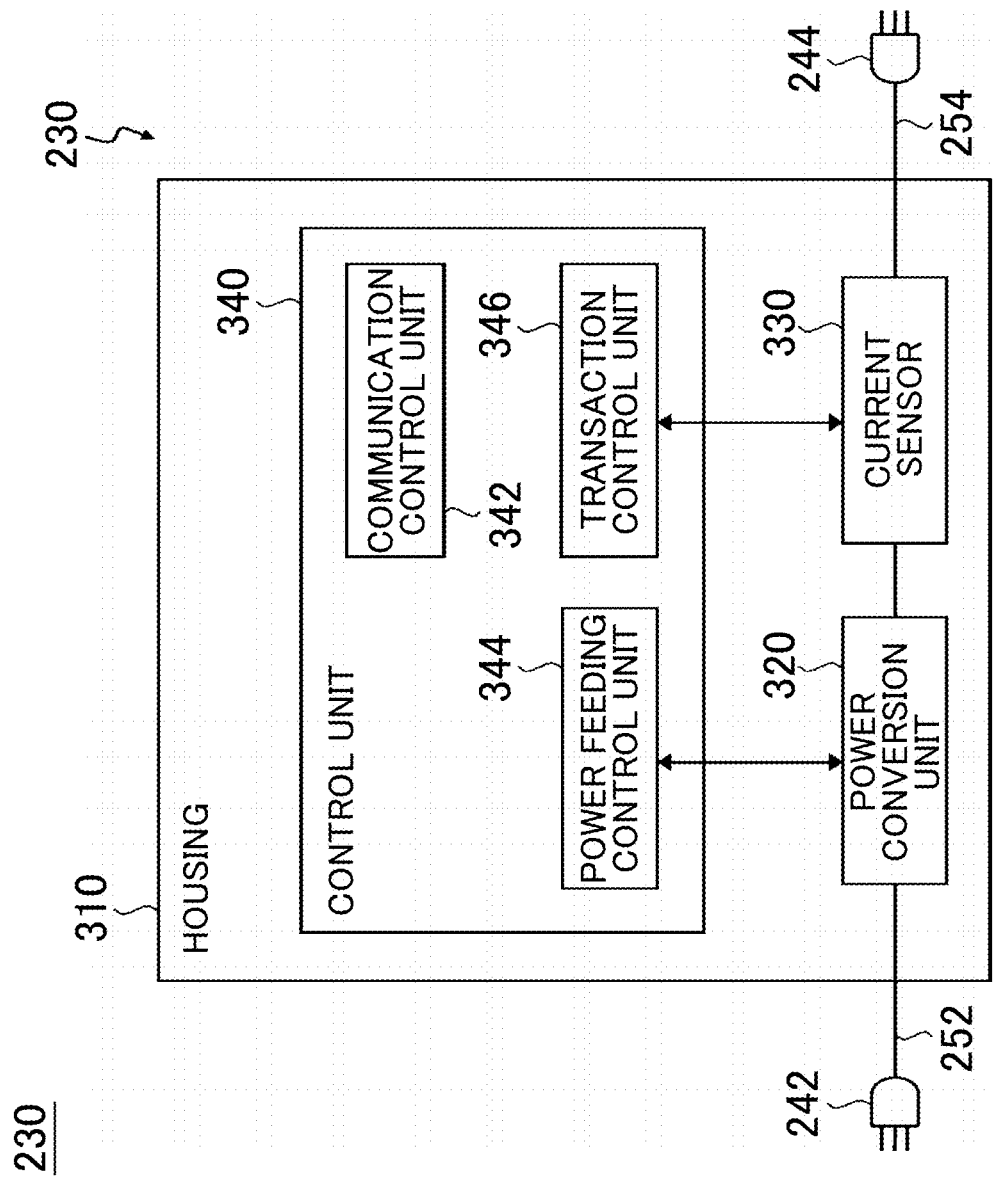
FIG. 3 schematically illustrates one example of an internal configuration of the control box 230.

FIG. 3 schematically illustrates one example of an internal configuration of the control box 230. In the present embodiment, the control box 230 includes a housing 310, a power conversion unit 320, a current sensor 330, and a control unit 340. In the present embodiment, the control unit 340 includes a communication control unit 342, a power feeding control unit 344, and a transaction control unit 346.

The power conversion unit 320 may be one example of the switching unit. The current sensor 330 may be one example of the measuring unit and the power feeding information acquiring unit. The communication control unit 342 may be one example of the power feeding side identification information acquiring unit, the power receiving side identification information acquiring unit, the power feeding information acquiring unit, the agreement information acquiring unit, the transmission unit, the communication monitoring unit and the adjustment unit. The power feeding control unit 344 may be one example of the restriction unit. The transaction control unit 346 may be one example of the power feeding information generating unit, the encryption unit and the transaction subject authentication unit.

In the present embodiment, the housing 310 houses the power conversion unit 320, the current sensor 330 and the control unit 340. In the present embodiment, the power feeding side connector 242 and the power receiving side connector 244 are arranged outside the housing 310. The housing 310 may also house the power feeding side cable 252 and the power receiving side cable 254. For example, the housing 310 may also include a winding mechanism (not shown) for the power feeding side cable 252 and the power receiving side cable 254.

In the present embodiment, the power conversion unit 320 converts a power input from the power feeding side 20 and outputs the converted power to the power receiving side 40. A power conversion type may be illustrated as a DC-DC conversion, an AC-DC conversion, and a DC-AC conversion. The power conversion unit 320 may also control start and stop of the power feeding.

In the present embodiment, the current sensor 330 acquires power feeding information about a power amount fed from the vehicle 22 or a power amount fed to the vehicle 42. For example, the current sensor 330 measures a physical amount related to the power amount fed from the vehicle 22 or the power amount fed to the vehicle 42. More specifically, in the present embodiment, the current sensor 330 measures a current value flowing through the charging cable 220. The current sensor 330 transmits information acquired by the current sensor 330 to the control unit 340.

In the present embodiment, the control unit 340 controls operations of the control box 230. In the present embodiment, the communication control unit 342 controls communication between the control box 230 and other devices. Other devices may be illustrated as the vehicle 22, the communication terminal 26, the vehicle 42, the communication terminal 46, the transaction management server 210 and the like. In the present embodiment, the power feeding control unit 344 controls operations of the power conversion unit 320. This allows the power feeding from the vehicle 22 to the vehicle 42 to be controlled. In the present embodiment, the transaction control unit 346 controls information processing for the power transaction between the power feeding side 20 and the power receiving side 40.

Figure 4:
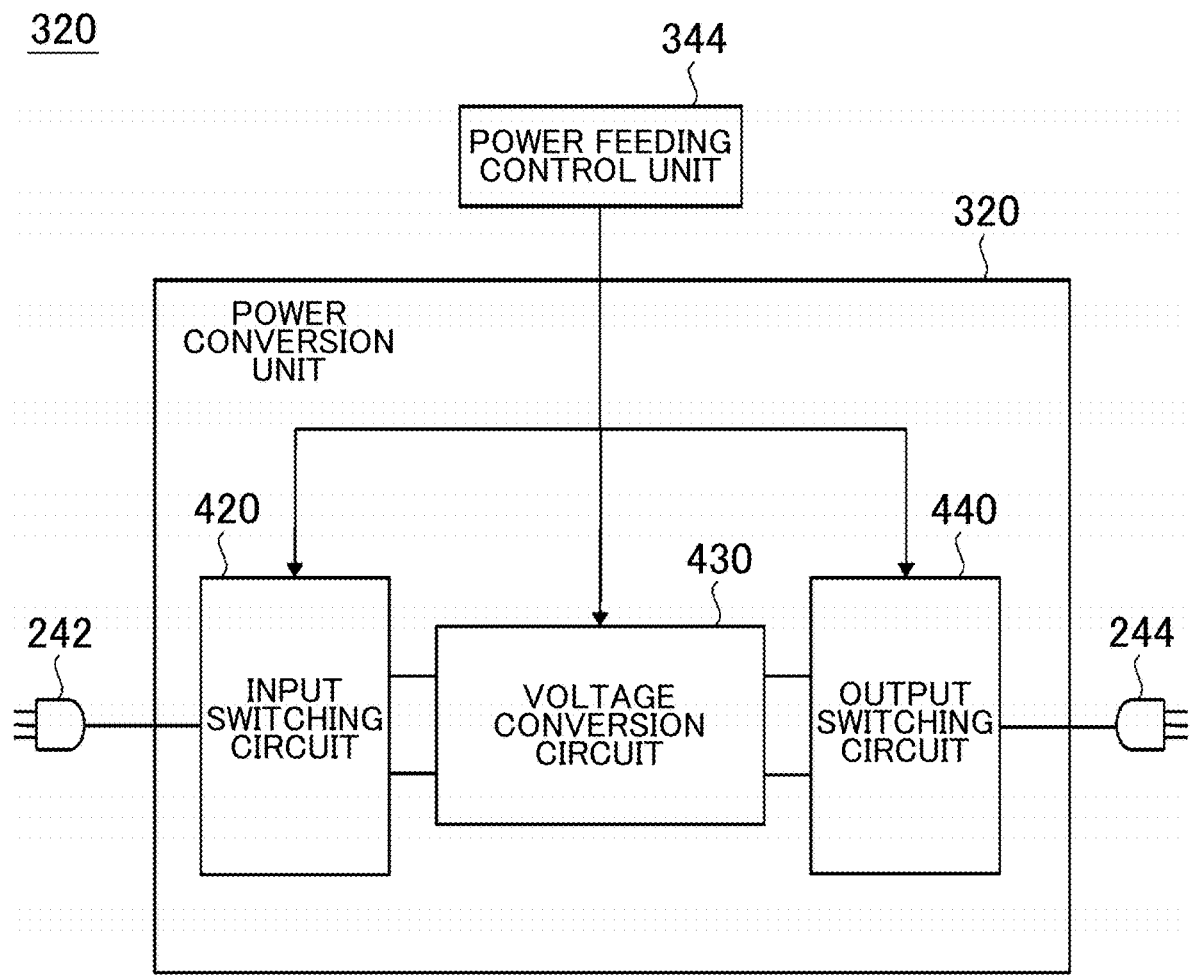
FIG. 4 schematically illustrates one example of an internal configuration of the power conversion unit 320.

FIG. 4 schematically illustrates one example of an internal configuration of the power conversion unit 320. In the present embodiment, the power conversion unit 320 includes an input switching circuit 420, a voltage conversion circuit 430, and an output switching circuit 440. At least one of the input switching circuit 420 and the output switching circuit 440 may be one example of the switching unit.

In the present embodiment, the input switching circuit 420 outputs a power input from the power feeding side 20 to an appropriate terminal of the voltage conversion circuit 430. In one embodiment, the input switching circuit 420 electrically couples one or more terminals of the power feeding side connector 242 to one or more terminals of the voltage conversion circuit 430, respectively, in accordance with an instruction from the power feeding control unit 344. In another embodiment, the input switching circuit 420 operates such that the terminal of the power feeding side connector 242 is not electrically coupled to the terminal of the voltage conversion circuit 430. The input switching circuit 420 may also operate to disconnect the electrical coupling between the terminal of the power feeding side connector 242 and the terminal of the voltage conversion circuit 430. This can stop the power feeding from the power feeding side 20 to the power receiving side 40.

In the present embodiment, the voltage conversion circuit 430 converts a power input from the input switching circuit 420 and outputs the converted power to the output switching circuit 440. A power conversion type may be illustrated as a DC-DC conversion, an AC-DC conversion, and a DC-AC conversion. The voltage conversion circuit 430 may include at least one of a DC-DC converter, an AC-DC converter, and a DC-AC inverter. The voltage conversion circuit 430 may adjust at least one of a type of the output power, an output voltage, and an output current, in accordance with an instruction from the power feeding control unit 344. The type of the output power may be illustrated as a direct current, an alternate current, a phase, a frequency and the like.

In the present embodiment, the output switching circuit 440 outputs a power input from the voltage conversion circuit 430 to the power receiving side 40. In one embodiment, the output switching circuit 440 electrically couples one or more terminals of the voltage conversion circuit 430 to one or more terminals of the power receiving side connector 244, respectively, in accordance with an instruction from the power feeding control unit 344. In another embodiment, the output switching circuit 440 operates such that the terminal of the power receiving side connector 244 and the terminal of the voltage conversion circuit 430 are not electrically coupled. This can stop the power feeding from the power feeding side 20 to the power receiving side 40.

Figure 5:
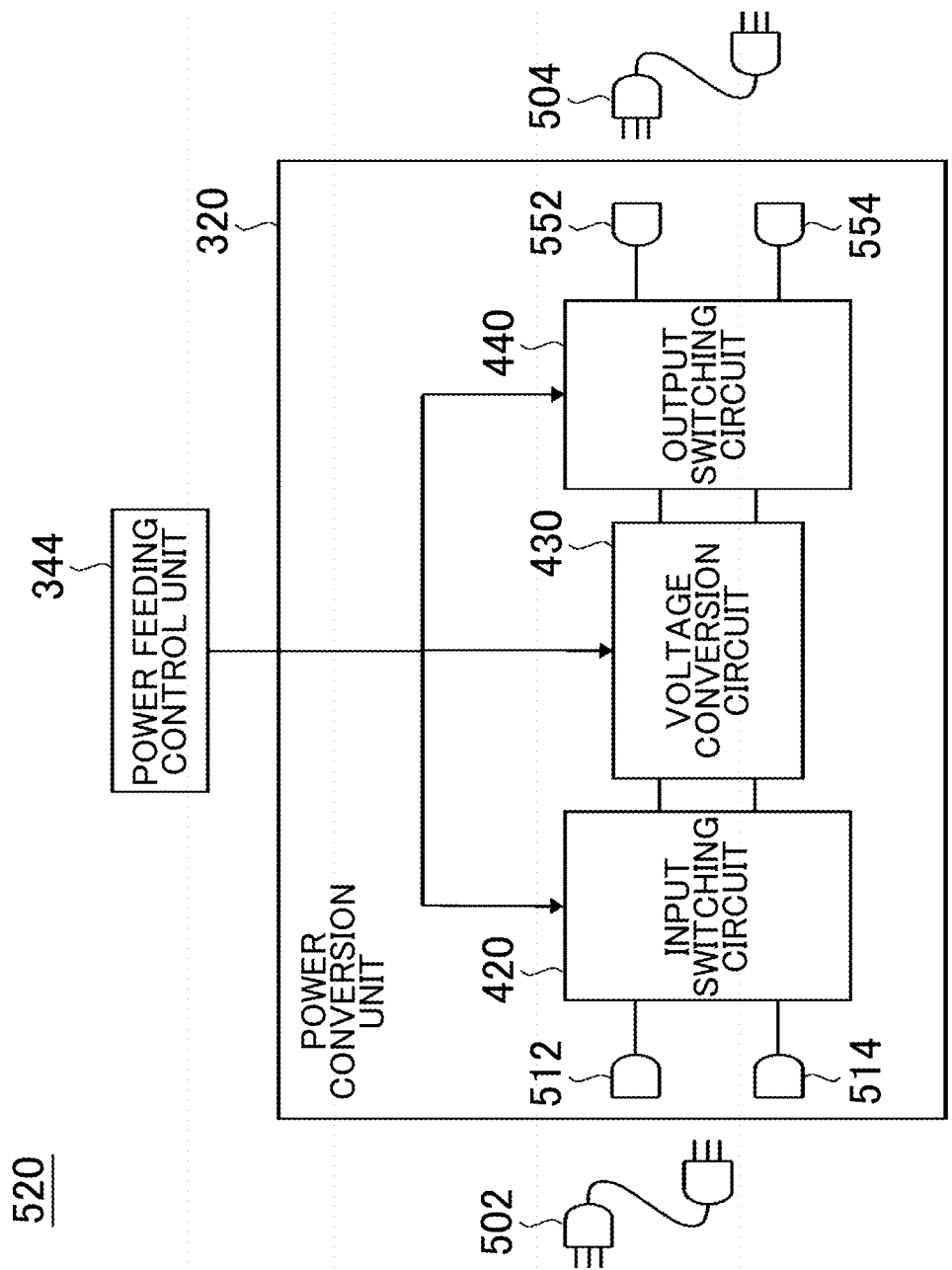
FIG. 5 schematically illustrates one example of an internal configuration of a power conversion unit 520.

FIG. 5 schematically illustrates one example of an internal configuration of a power conversion unit 520. In the present embodiment, the power conversion unit 520 is different from the power conversion unit 320 in that it includes one or more AC input connectors 512 and one or more DC input connectors 514, instead of the power feeding side connector 242. Also, the power conversion unit 520 is different from the power conversion unit 320 in that it includes one or more AC output connectors 552 and one or more DC output connectors 554, instead of the power receiving side connector 244. Each of the AC input connector 512, the DC input connector 514, the AC output connector 552 and the DC output connector 554 may be a plug, or may be a receptacle.

In the present embodiment, one end of another charging cable 502 is electrically coupled to the AC input connector 512 or the DC input connector 514. The other end of the charging cable 502 is electrically coupled to the vehicle 22. This allows the AC input connector 512 or the DC input connector 514 to be electrically coupled to the vehicle 22 via the charging cable 502. In the present embodiment, one end of another charging cable 504 is electrically coupled to the AC output connector 552 or the DC output connector 554. The other end of the charging cable 504 is electrically coupled to the vehicle 42. This allows the AC output connector 552 or the DC output connector 554 to be electrically coupled to the vehicle 42 via the charging cable 504.

The AC input connector 512 may be one example of the power feeding side connector and the AC input unit. The DC input connector 514 may be one example of the power feeding side connector and the DC input unit. The AC output connector 552 may be one example of the power receiving side connector and the AC output unit. The DC output connector 554 may be one example of the power receiving side connector and the DC output unit. The charging cable 502 may be one example of the first charging cable. The charging cable 504 may be one example of the second charging cable.

In accordance with the present embodiment, the voltage conversion circuit 430 includes a DC-DC converter, an AC-DC converter, and a DC-AC inverter. At least one of the input switching circuit 420 and the output switching circuit 440 switches a connection relation between: (i) the AC input connector 512 and the DC input connector 514; and (ii) the AC output connector 552 and the DC output connector 554, and electrically couples: (i) one of the AC input connector 512 and the DC input connector 514; and (ii) one of the AC output connector 552 and the DC output connector 554.

For example, the input switching circuit 420 electrically couples, one or more terminals of the AC input connector 512 or one or more terminals of the DC input connector 514 to one or more terminals of the voltage conversion circuit 430, respectively, in accordance with an instruction from the power feeding control unit 344. Also, the output switching circuit 440 electrically couples one or more terminals of the voltage conversion circuit 430 to one or more terminals of the AC output connector 552 or one or more terminals of the DC output connector 554, respectively, in accordance with an instruction from the power feeding control unit 344, for example.

This results in various combinations of input types and output types accepted. As a result, it allows for the power transaction, irrespective of the type of power feeding equipment in the power feeding side 20 (for example, an outlet, a power generation apparatus, an ordinary charging apparatus, a high-speed charging apparatus and the like in each household. Also, it allows the power feeding from a plurality of vehicles 22 to one vehicle 42, or power feeding from one vehicle 22 to a plurality of vehicles 42.

Figure 6:
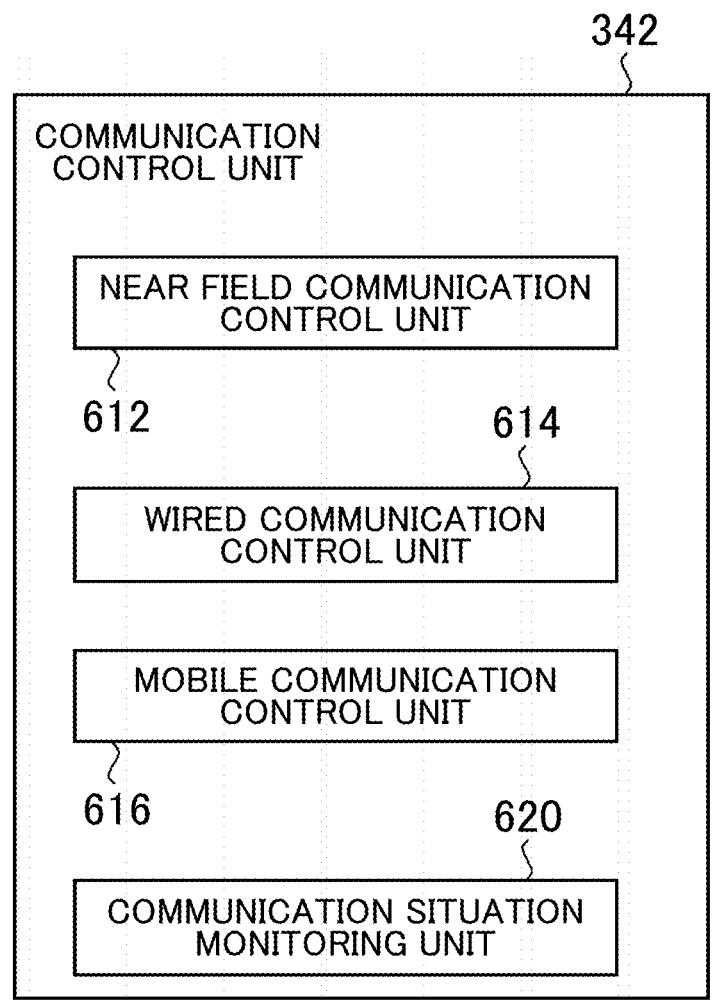
FIG. 6 schematically illustrates one example of an internal configuration of the communication control unit 342.

FIG. 6 schematically illustrates one example of an internal configuration of the communication control unit 342. In the present embodiment, the communication control unit 342 includes a near field communication control unit 612, a wired communication control unit 614, a mobile communication control unit 616, and a communication situation monitoring unit 620. The near field communication control unit 612 may be one example of the power feeding side identification information acquiring unit or the power receiving side identification information acquiring unit. The wired communication control unit 614 may be one example of the power feeding side identification information acquiring unit or the power receiving side identification information acquiring unit. The mobile communication control unit 616 may be one example of the transmission unit. The communication situation monitoring unit 620 may be one example of the communication monitoring unit and the adjustment unit.

In the present embodiment, the near field communication control unit 612 controls a near field communication. Also, the wired communication control unit 614 controls a wired communication. In one embodiment, at least one of the near field communication control unit 612 and the wired communication control unit 614 acquires a power feeding side ID from the vehicle 22 or the communication terminal 26. Also, at least one of the near field communication control unit 612 and the wired communication control unit 614 acquires a power receiving side ID from the vehicle 42 or the communication terminal 46.

In another embodiment, at least one of the near field communication control unit 612 and the wired communication control unit 614 acquires information used for authentication of the transaction counterparties from the vehicle 22 or the communication terminal 26. The information used for authentication of transaction counterparties may also be agreement information described later.

The mobile communication control unit 616 controls a mobile communication. For example, the mobile communication control unit 616 associates the power feeding side ID and the power receiving side ID acquired by the near field communication control unit 612 or the wired communication control unit 614, with the power feeding information acquired by the transaction control unit 346, and transmits them to the transaction management server 210. The information described above may also be encrypted. In one embodiment, the mobile communication control unit 616 transmits information including the power feeding side ID, the power receiving side ID and the power feeding information to the transaction management server 210. In another embodiment, the mobile communication control unit 616 associates information in which at least two of the power feeding side ID, the power receiving side ID and the power feeding information are associated with one another, with remaining information, and transmits them to the transaction management server 210.

For example, the mobile communication control unit 616 associates first information in which the power feeding side ID is associated with the power feeding information, with second information in which the power receiving side ID is associated with the power feeding information, and transmits them to the transaction management server 210. Note that the first information may be one example of first transaction information. The second information may be one example of second transaction information. More specifically, the mobile communication control unit 616 transmits the first information to the transaction management server 210, for example, via at least one of the vehicle 22 and the communication terminal 26, and the communication network 10. The mobile communication control unit 616 transmits the second information to the transaction management server 210, for example, through the vehicle 42 or the communication terminal 46 and via the communication network 10.

In another embodiment, the mobile communication control unit 616 associates with one another: (i) the power feeding side ID and the power receiving side ID acquired by the near field communication control unit 612 or the wired communication control unit 614; (ii) the power feeding information acquired by the transaction control unit 346; (iii) at least one of the identification information of the current sensor 330 and the identification information of the control box 230; and (iv) the authentication information stored in the transaction control unit 346, and transmits them to the transaction management server 210.

In still another embodiment, the mobile communication control unit 616 receives the information transmitted from the transaction management server 210. For example, the transaction management server 210 intermediates in the power transaction between the power feeding side 20 and the power receiving side 40, and generates agreement information including at least one of the power feeding side ID and the power receiving side ID. Also, the transaction management server 210 transmits the agreement information to: (i) the vehicle 22 or the communication terminal 26; and (ii) at least one of the vehicle 42 or the communication terminal 46. The agreement information may also be encrypted.

In the present embodiment, the communication situation monitoring unit 620 monitors communication situations between: the control box 230; and (i) the vehicle 22 or the communication terminal 26 and (ii) the vehicle 42 or the communication terminal 46. If the control box 230 detects a communication error, it transmits to the power feeding control unit 344, information indicating that the error occurs in the communication. The communication error may be illustrated as disconnection of the connection between the control box 230 and at least one of (i) the vehicle 22 or the communication terminal 26 and (ii) the vehicle 42 or the communication terminal 46, and the like.

In the present embodiment, the communication situation monitoring unit 620 may adjust time intervals for monitoring the communication situations. In accordance with one embodiment, the communication situation monitoring unit 620 acquires information about a scheduled ending time of charging. For example, the communication situation monitoring unit 620 acquires the information about the scheduled ending time of charging from the transaction management server 210. The communication situation monitoring unit 620 may also acquire the information about the scheduled ending time of charging from the power feeding control unit 344. The communication situation monitoring unit 620 may also estimate the scheduled ending time of charging based on temporal changes of the power storage apparatus of the vehicle 42. Then, the communication situation monitoring unit 620 may adjust time intervals for monitoring the communication situation such that a time interval in the first time period is different from a time interval in the second time period which is closer to the scheduled ending time of charging than the first time period. The time interval in the first time period may also be longer than the time interval in the second time period. This can improve efficiency of monitoring. Also, power consumption can be suppressed.

Figure 7:
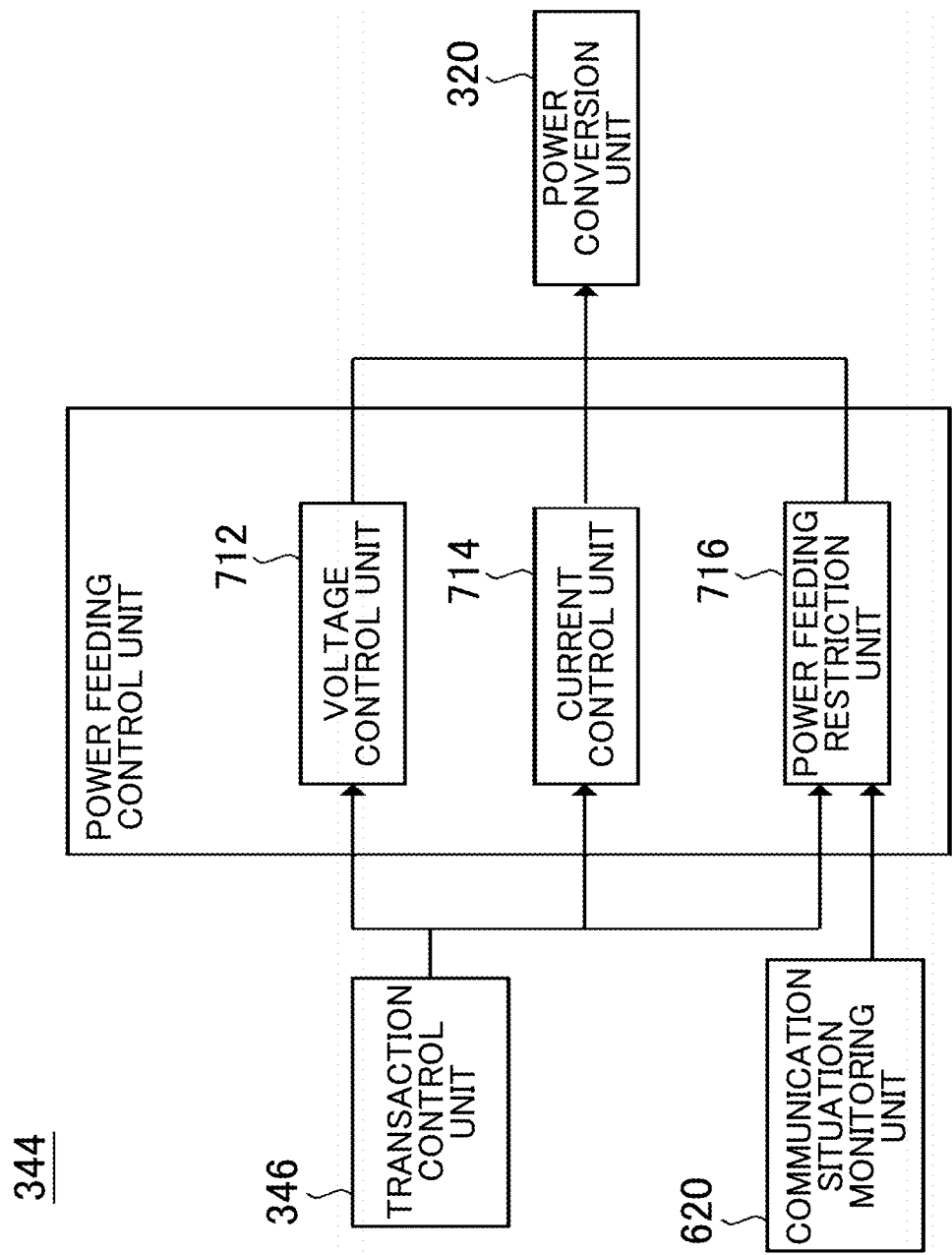
FIG. 7 schematically illustrates one example of an internal configuration of the power feeding control unit 344.

FIG. 7 schematically illustrates one example of an internal configuration of the power feeding control unit 344. In the present embodiment, the power feeding control unit 344 includes a voltage control unit 712, a current control unit 714, and a power feeding restriction unit 716. The power feeding restriction unit 716 may be one example of the restriction unit.

In the present embodiment, the voltage control unit 712 controls an output voltage. The voltage control unit 712 may control an output voltage by adjusting a setting value of the voltage conversion circuit 430. The voltage control unit 712 may control an output voltage based on an instruction of the transaction control unit 346. In the present embodiment, the current control unit 714 controls an output current. The current control unit 714 may control an output current by adjusting a setting value of the voltage conversion circuit 430. The current control unit 714 may control an output current based on an instruction of the transaction control unit 346.

In the present embodiment, the power feeding restriction unit 716 restricts the power feeding from the power feeding side 20 to the power receiving side 40. In one embodiment, the power feeding restriction unit 716 restricts the power feeding from the power feeding side 20 to the power receiving side 40, if the communication situation monitoring unit 620 detects an error in the communication situation described above. In another embodiment, the power feeding restriction unit 716 restricts power feeding based on an instruction of the transaction control unit 346 or the transaction management server 210. For example, the power feeding restriction unit 716 restricts power feeding based on a result of each type of authentication processes in the transaction management server 210 or the transaction control unit 346. The authentication process may be illustrated as an authentication process related to at least one of the power feeding side 20 and the power receiving side 40, an authentication process related to the charging cable 220, the control box 230 or the current sensor 330, and the like.

The restriction method of power feeding may be illustrated as stop of power feeding, decrease in a power feeding speed and the like. In one embodiment, the power feeding restriction unit 716 restricts power feeding by controlling at least one of the input switching circuit 420 and the output switching circuit 440 of the power conversion unit 320 to disconnect an electrical coupling between the power feeding side connector 242 and the power receiving side connector 244. In another embodiment, the power feeding restriction unit 716 may also lower the power feeding speed by adjusting a setting value of the voltage conversion circuit 430.

Figure 8:
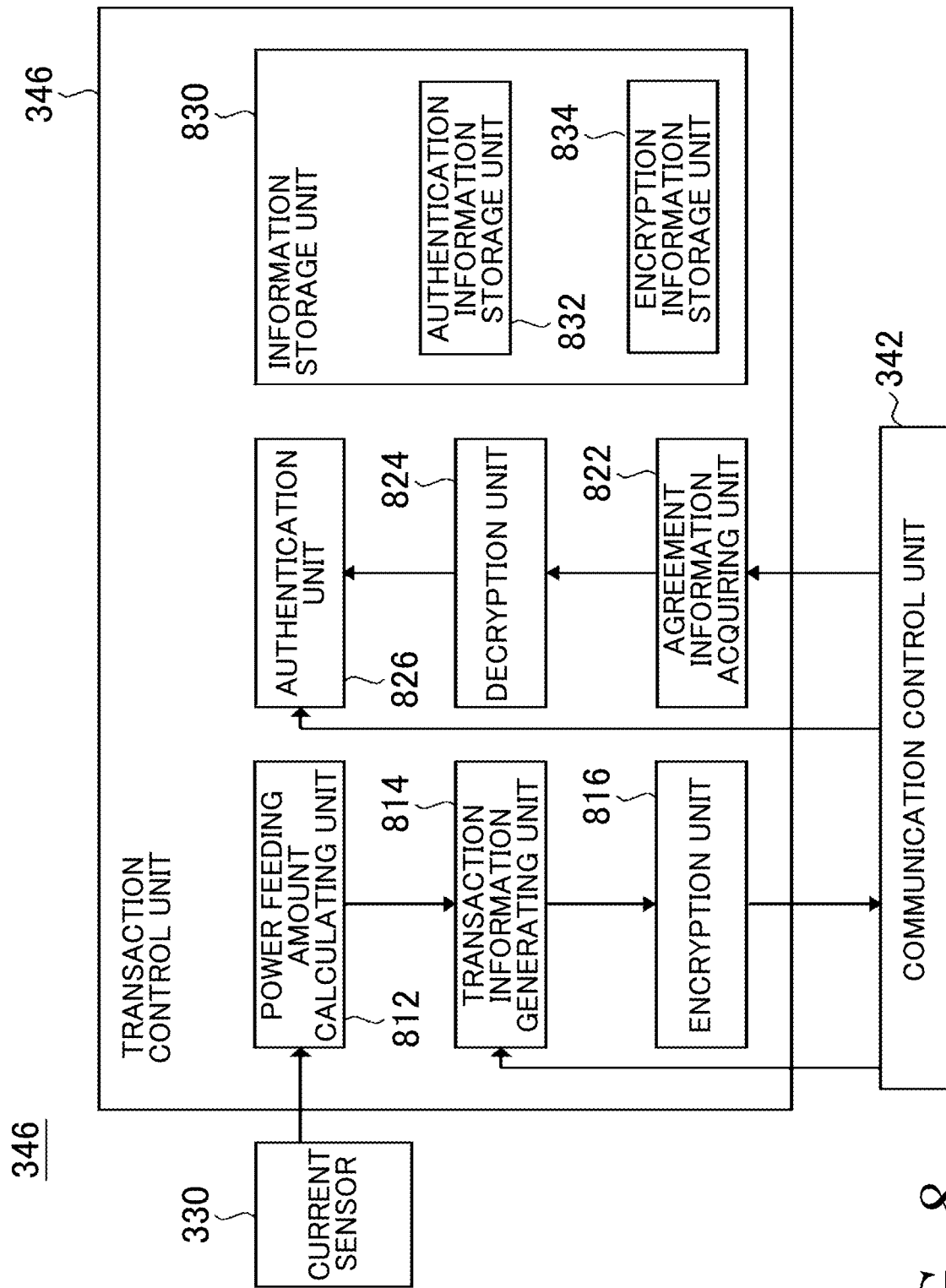
FIG. 8 schematically illustrates one example of an internal configuration of the transaction control unit 346.

FIG. 8 schematically illustrates one example of an internal configuration of the transaction control unit 346. In the present embodiment, the transaction control unit 346 includes a power feeding amount calculating unit 812, a transaction information generating unit 814, an encryption unit 816, an agreement information acquiring unit 822, a decryption unit 824, an authentication unit 826, an information storage unit 830. In the present embodiment, the information storage unit 830 includes an authentication information storage unit 832 and an encryption information storage unit 834. The power feeding amount calculating unit 812 may be one example of the power feeding information generating unit. The transaction information generating unit 814 may be one example of the power feeding information acquiring unit. The authentication unit 826 may be one example of the transaction subject authentication unit.

In the present embodiment, the power feeding amount calculating unit 812 generates the power feeding information based on a current value measured by the current sensor 330. More specifically, the power feeding amount calculating unit 812 receives measured data of the current value from the current sensor 330. The power feeding amount calculating unit 812 calculates a power amount fed from the vehicle 22 or a power amount fed to the vehicle 42, by integrating current values measured by the current sensor 330.

In the present embodiment, the transaction information generating unit 814 associates with one another: the power feeding side ID; the power receiving side ID; and the power feeding information. For example, the transaction information generating unit 814 acquires the power feeding ID and the power receiving ID acquired by the communication control unit 342. Also, the transaction information generating unit 814 acquires the power feeding information calculated by the power feeding amount calculating unit 812. The transaction information generating unit 814 generates the transaction information which includes the power feeding side ID, the power receiving side ID and the power feeding information.

In the present embodiment, the encryption unit 816 encrypts each type of information. The encryption unit 816 may also encrypt each type of information to which signature data is added. The encryption unit 816 may transmit the encrypted information to the transaction management server 210 via the communication control unit 342. In one embodiment, the encryption unit 816 encrypts at least one of the power feeding side ID, the power receiving side ID and the power feeding information. For example, the encryption unit 816 encrypts the transaction information generated by the transaction information generating unit 814. The encryption method is not particularly limited, but the encryption unit 816 may encrypt the transaction information by using a second encryption key stored in the encryption information storage unit 834. The second encryption key corresponds to a second decryption key stored in the transaction management server 210.

In another embodiment, the encryption unit 816 may encrypt the authentication information used for authentication of the charging cable 220, the control box 230 or the current sensor 330 in the transaction management server 210. The authentication information includes at least one of: (i) characteristic information indicating characteristics of the charging cable 220 or the current sensor 330; and (ii) a passphrase used for authentication of the charging cable 220, the control box 230 or the current sensor 330. The characteristics of the charging cable 220 or the current sensor 330 may be illustrated as an electric resistance value, accuracy and the like of the charging cable 220 or the current sensor 330.

The encryption method is not particularly limited, but the encryption unit 816 may encrypt the authentication information by using a first encryption key stored in the encryption information storage unit 834. The first encryption key corresponds to a first decryption key stored in the transaction management server 210. The encryption unit 816 may also encrypt information in which (a) at least one of: the identification information of the charging cable; the identification information of the control box 230; and the identification information of the current sensor 330 is associated with (b) the authentication information. Appropriate information in accordance with the identification information described above is selected as the authentication information. Note that the encryption unit 816 may also encrypt information in which the transaction information is associated with the authentication information.

In the present embodiment, the agreement information acquiring unit 822 acquires the agreement information generated by the transaction management server 210. The agreement information includes information about the content of the agreed power transaction. The agreement information includes, for example, at least one of the transaction ID, the power feeding side ID, the power receiving side ID, information indicating a charging amount, information indicating a scheduled ending time of charging, information indicating a unit price of the power, and a passphrase for authenticating the transaction subject. The agreement information may include the power feeding side ID and the power receiving side ID. The agreement information acquiring unit 822 acquires, for example, the agreement information received by the communication control unit 342.

In the present embodiment, the decryption unit 824 decrypts encrypted information. For example, if the agreement information acquired by the agreement information acquiring unit 822 is encrypted, the decryption unit 824 decrypts the agreement information. The agreement information may also be encrypted by using a third encryption key which corresponds to a third decryption key stored in the encryption information storage unit 834. This allows the decryption unit 824 to decrypt the agreement information by using the third decryption key.

In the present embodiment, the authentication unit 826 authenticates at least one of the power feeding side 20 and the power receiving side 40 to check validity of the concerned party of the power transaction. For example, the authentication unit 826 authenticates at least one of the power feeding side and the power receiving side based on at least one of the power feeding side ID and the power receiving side ID included in the agreement information, and at least one of the power feeding side ID and the power receiving side ID acquired by the communication control unit 342.

For example, the authentication unit 826 authenticates the power feeding side 20 and the power receiving side 40, if the power feeding side ID included in the agreement information matches the power feeding side ID acquired by the communication control unit 342 from the power feeding side 20, and if the power receiving side ID included in the agreement information matches the power receiving side ID acquired by the communication control unit 342 from the power receiving side 40. The authentication unit 826 may also omit authentication of the owner of the charging cable 220. For example, if the user 24 owns the charging cable 220 in the power feeding side 20, and if the power receiving side ID included in the agreement information matched the power receiving side ID acquired by the communication control unit 342 from the power receiving side 40, the authentication unit 826 authenticates the power receiving side 40.

The authentication unit 826 may also acquire information indicating a result of the authentication process of the charging cable 220, the control box 230 or the current sensor 330 in the transaction management server 210. For example, the authentication unit 826 acquires information indicating the result of the authentication process described above, from the transaction management server 210 via the communication control unit 342.

If the authentication result satisfies a predetermined condition, the authentication unit 826 transmits to the power feeding restriction unit 716, (i) an instruction for lifting the restriction on the power feeding; or (ii) an instruction indicating permission of the power feeding. The predetermined condition may be illustrated as: a condition that at least one of the power feeding side and the power receiving side is successfully authenticated; a condition that the charging cable 220, the control box 230 or the current sensor 330 is successfully authenticated; and a condition that both of (i) at least one of the power feeding side and the power receiving side and (ii) the charging cable 220, the control box 230 or the current sensor 330 are successfully authenticated, and the like. This can further improve reliability of the power transaction.

The authentication unit 826 may receive, from the transaction management server 210, a signal indicating that the error in the power transaction is detected. If the authentication unit 826 receives the signal described above, it may transmit an instruction for restricting the power feeding, to the power feeding restriction unit 716. This can further improve reliability of the power transaction.

The information storage unit 830 stores each type of information. The authentication information storage unit 832 stores the authentication information which include at least one of the characteristic information indicating characteristics of the current sensor 330, and a passphrase used for authentication of the control box 230 or the current sensor 330. The encryption information storage unit 834 stores an encryption key used by the encryption unit 816. The encryption information storage unit 834 stores a decryption key used by the decryption unit 824.

Figure 9:
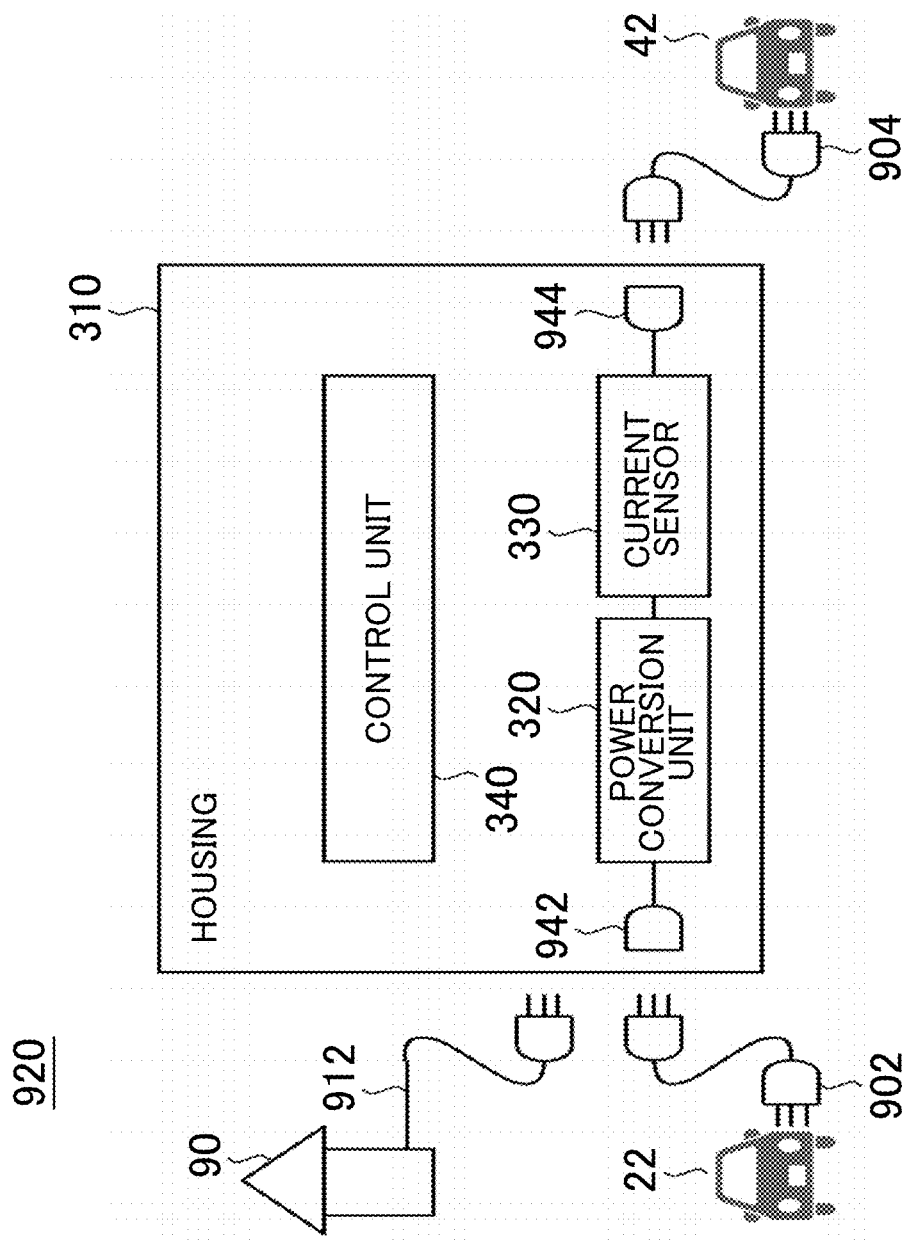
FIG. 9 schematically illustrates one example of an internal configuration of a charging adaptor 920.

FIG. 9 schematically illustrates one example of an internal configuration of a charging adaptor 920. In the present embodiment, the charging adaptor 920 is different from the charging cable 220 in that it includes a power feeding side connector 942 and a power receiving side connector 944 incorporated into the housing 310, instead of the power feeding side connector 242 and the power receiving side connector 244 provided at distal ends of the power feeding side cable 252 and the power receiving side cable 254 arranged outside the housing 310. For the other points, it may have a configuration similar to that of the charging cable 220. In the present embodiment, the power feeding side connector 942 is electrically coupled to: (i) a charging cable 912 connected an outlet in a house 90; or (ii) another charging cable 902. The power receiving side connector 944 is electrically coupled to another charging cable 904.

Figure 10:
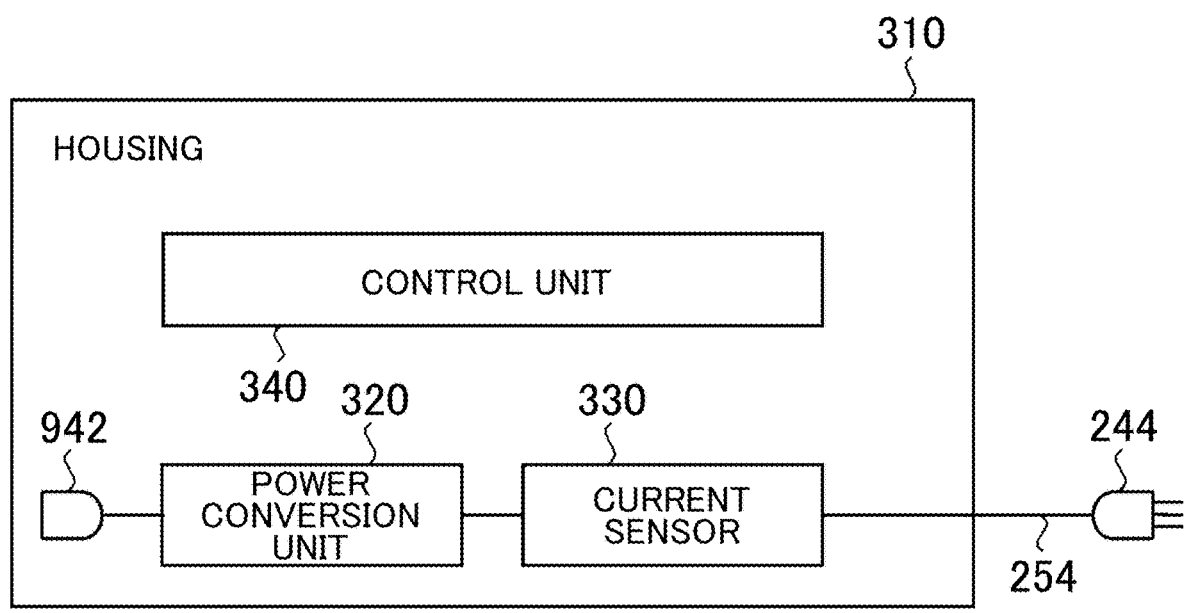
FIG. 10 schematically illustrates one example of an internal configuration of a charging adaptor 1020.

FIG. 10 schematically illustrates one example of an internal configuration of a charging adaptor 1020. The charging adaptor 1020 is different from the charging cable 220 in that it includes a power feeding side connector 942 incorporated into the housing 310, instead of the power feeding side connector 242 provided at the distal end of the power feeding side cable 252 arranged outside the housing 310. For the other points, it may have a configuration similar to that of the charging cable 220. It is different from the charging cable 220 in that it includes a power receiving side connector 944 incorporated into the housing 310, instead of the power receiving side connector 244 provided at the distal end of the power receiving side cable 254 arranged outside the housing 310. For the other points, it may have a configuration similar to that of the charging cable 220.

Figure 11:
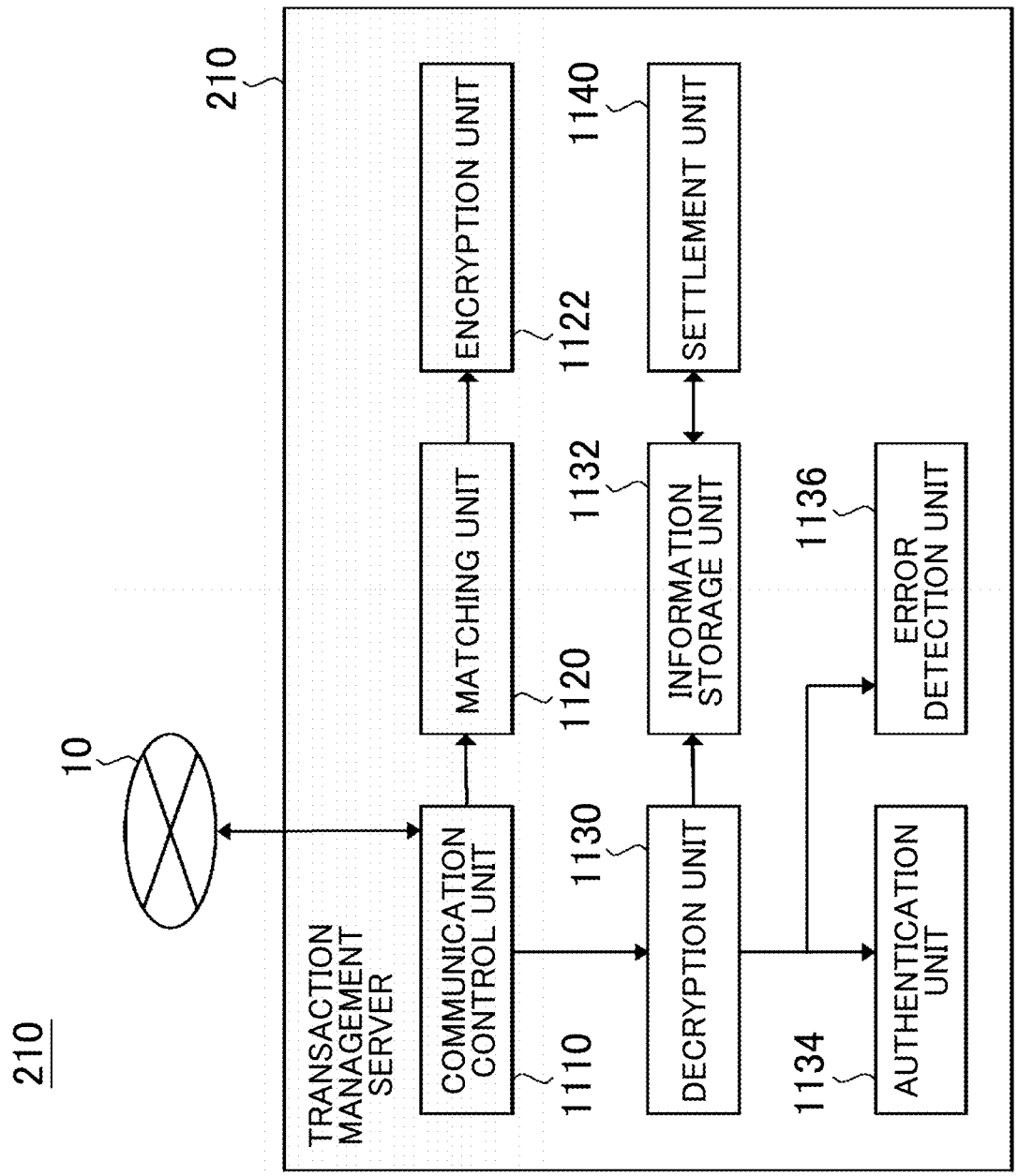
FIG. 11 schematically illustrates one example of a system configuration of a transaction management server 210.

FIG. 11 schematically illustrates one example of a system configuration of a transaction management server 210. In the present embodiment, the transaction management server 210 includes a communication control unit 1110, a matching unit 1120, an encryption unit 1122, a decryption unit 1130, an information storage unit 1132, an authentication unit 1134, an error detection unit 1136, and a settlement unit 1140.

In the present embodiment, the communication control unit 1110 controls a communication between the transaction management server 210 and other devices. Other devices may be illustrated as at least one of the control box 230, the vehicle 22, the communication terminal 26, the vehicle 42, and the communication terminal 46. The communication control unit 1110 forwards information acquired from other devices to another appropriate component of the transaction management server 210, for example. In the present embodiment, the communication control unit 1110 forwards information acquired from other devices, to the matching unit 1120 or the decryption unit 1130. The communication control unit 1110 forwards, for example, information acquired from other components of the transaction management server 210, to other devices.

In the present embodiment, the communication control unit 1110 acquires the transaction information in which the power feeding side ID, the power receiving side ID and the power feeding information are associated with one another, from at least one of the control box 230, the vehicle 22, the communication terminal 26, the vehicle 42, and the communication terminal 46, via the communication network 10. In accordance with one embodiment, the communication control unit 1110 receives the transaction information which includes the power feeding side ID, the power receiving side ID and the power feeding information. In accordance with another embodiment, the communication control unit 1110 acquires a plurality of pieces of information from at least one of the power feeding management apparatus 120, the vehicle 22, the communication terminal 26, the vehicle 42, and the communication terminal 46. The communication control unit 1110 may also acquire a plurality of pieces of information from at least two of the power feeding management apparatus 120, the vehicle 22, the communication terminal 26, the vehicle 42, and the communication terminal 46. Each of a plurality of pieces of information includes at least one of the power feeding side ID, the power receiving side ID and the power feeding information.

For example, the communication control unit 1110 acquires the first information in which the power feeding side ID is associated with the power feeding information, from the vehicle 22 or the communication terminal 26, via the communication network 10. The power feeding information in the first information may indicate the power amount calculated based on the physical amount measured by a device mounted on the vehicle 22, or may indicate the power amount calculated based on the physical amount measured by a device mounted on the charging cable 220. Also, the communication control unit 1110 acquires the second information in which the power receiving side ID and is associated with the power feeding information, from the vehicle 42 or the communication terminal 46, via the communication network 10. The power feeding information in the second information may indicate the power amount calculated based on the physical amount measured by a device mounted on the vehicle 42, or may indicate the power amount calculated based on the physical amount measured by a device mounted on the charging cable 220.

In the present embodiment, the communication control unit 1110 may also acquire, from at least one of the control box 230, the vehicle 22, the communication terminal 26, the vehicle 42, and the communication terminal 46, via the communication network 10, information in which (a) at least one of the identification information of the current sensor 330 and the identification information of the control box 230 is associated with (b) the authentication information. The authentication information described above may include at least one of: (i) characteristic information indicating characteristics of the charging cable 220 or the current sensor 330; and (ii) a passphrase used for authentication of the charging cable 220, the control box 230 or the current sensor 330.

In the present embodiment, the matching unit 1120 intermediates in the power transaction between the power feeding side 20 and the power receiving side 40. If the power transaction in which the matching unit 1120 intermediates reaches an agreement, the matching unit 1120 generates the agreement information which includes at least one of the power feeding side ID and the power receiving side ID. The agreement information may include at least one of the power feeding side ID, the power receiving side ID, information indicating a charging amount, information indicating a scheduled ending time of charging, information indicating a unit price of the power, and a passphrase for authenticating the transaction subject.

The agreement information is, for example, transmitted to the control box 230 for used for authentication of the concerned party of the transaction. The agreement information may be directly transmitted to the control box 230 via the communication network 10, or may be transmitted to the control box 230 via at least one of (i) the vehicle 22 or the communication terminal 26, and (ii) the vehicle 42 or the communication terminal 46.

In the present embodiment, the encryption unit 1122 encrypts each type of information. For example, the encryption unit 1122 encrypts the agreement information generated by the matching unit 1120. The encryption method is not particularly limited, but the encryption unit 1122 may encrypt the agreement information by using the third encryption key which corresponds to the third decryption key stored in the control box 230. The encryption unit 1122 may also encrypt the agreement information to which signature data is added. The encryption unit 1122 transmits the encrypted agreement information to, for example, at least one of the control box 230, the vehicle 22, the communication terminal 26, the vehicle 42, and the communication terminal 46.

In the present embodiment, the decryption unit 1130 decrypts the encrypted information. In one embodiment, if the authentication information is encrypted with the first encryption key which corresponds to the first decryption key stored in the information storage unit 1132, the decryption unit 1130 decrypts the encrypted authentication information by using the first decryption key. In another embodiment, if the transaction information is encrypted with the second encryption key which corresponds to the second decryption key stored in the information storage unit 1132, the decryption unit 1130 decrypts the encrypted transaction information by using the second decryption key.

The decryption unit 1130 forwards the information received from the communication control unit 1110 or the decrypted data thereof to other appropriate components. For example, the decryption unit 1130 forwards the transaction information generated by the control box 230 to the information storage unit 1132 and the error detection unit 1136. The decryption unit 1130 forwards the authentication information generated by the control box 230 to the authentication unit 1134.

In the present embodiment, the information storage unit 1132 stores each type of information. The information storage unit 1132 stores, for example, the transaction information acquired by the communication control unit 1110. The information storage unit 1132 may also store the authentication information to be used for the authentication process in the authentication unit 1134. The information storage unit 1132 stores, for example, the identification information of the charging cable 220, the control box 230 or the current sensor 330 and at least one of: (i) the characteristic information indicating characteristics of the charging cable 220 or the current sensor 330; and (ii) a passphrase used for authentication of the charging cable 220, the control box 230 or the current sensor 330, such that they are associated with one another.

The authentication unit 1134 executes each type of authentication processes. For example, the authentication unit 1134 verifies the authentication information acquired by the communication control unit 1110 with the authentication information stored in the information storage unit 1132 in advance, and if the former matches the latter, it authenticates the charging cable 220, the control box 230 or the current sensor 330. The authentication unit 1134 may transmit the authentication result to the control box 230. The authentication result may be directly transmitted to the control box 230 via the communication network 10, or may be transmitted to the control box 230 via at least one of (i) the vehicle 22 or the communication terminal 26, and (ii) the vehicle 42 or the communication terminal 46.

In the present embodiment, the error detection unit 1136 detects an error in the power transaction. For example, the error detection unit 1136 compares the power amount indicated by the first information acquired by the communication control unit 1110 with the power amount indicated by the second information acquired by the communication control unit 1110. The error detection unit 1136 determines that an error occurs in the power transaction, if a difference between the power amount indicated by the first information and the power amount indicated by the second information is larger than a predetermined value.

If the error detection unit 1136 detects an error in the power transaction, it may transmit information about the error to the control box 230. The information described above may be directly transmitted to the control box 230 via the communication network 10, or may be transmitted to the control box 230 via at least one of (i) the vehicle 22 or the communication terminal 26, and (ii) the vehicle 42 or the communication terminal 46.

Irrespective of whether an error occurs in the power transaction, the error detection unit 1136 may transmit at least one of the power amount indicated by the first information and the power amount indicated by the second information, to at least one of the vehicle 22 or the communication terminal 26 and the vehicle 42 or the communication terminal 46. This allows the user 24, for example, to monitor the transaction by checking the power amount indicated by the first information and the power amount indicated by the second information, by using the communication terminal 26. The user 24 can also monitor the transaction by checking a remaining battery amount displayed on an instrument of the vehicle 22 and a transaction power amount displayed on the display apparatus of the communication terminal 26.

The settlement unit 1140 settles charges of the power transaction. For example, the settlement unit 1140 calculates the charges by multiplying a power amount fed from the power feeding side 20 to the power receiving side 40 by the unit price of the power included in the agreement information. The settlement unit 1140 may transmit information about the charges and the breakdown thereof to the communication terminal 26 and the communication terminal 46. The settlement unit 1140 may cause an indication to be displayed for requesting the user 24 and the user 44 to check the charges. The settlement unit 1140 may receive information indicating that each user checked the charges from the communication terminal 26 and the communication terminal 46. The settlement unit 1140 may also have a payment function. The payment method is not particularly limited.

Figure 12:
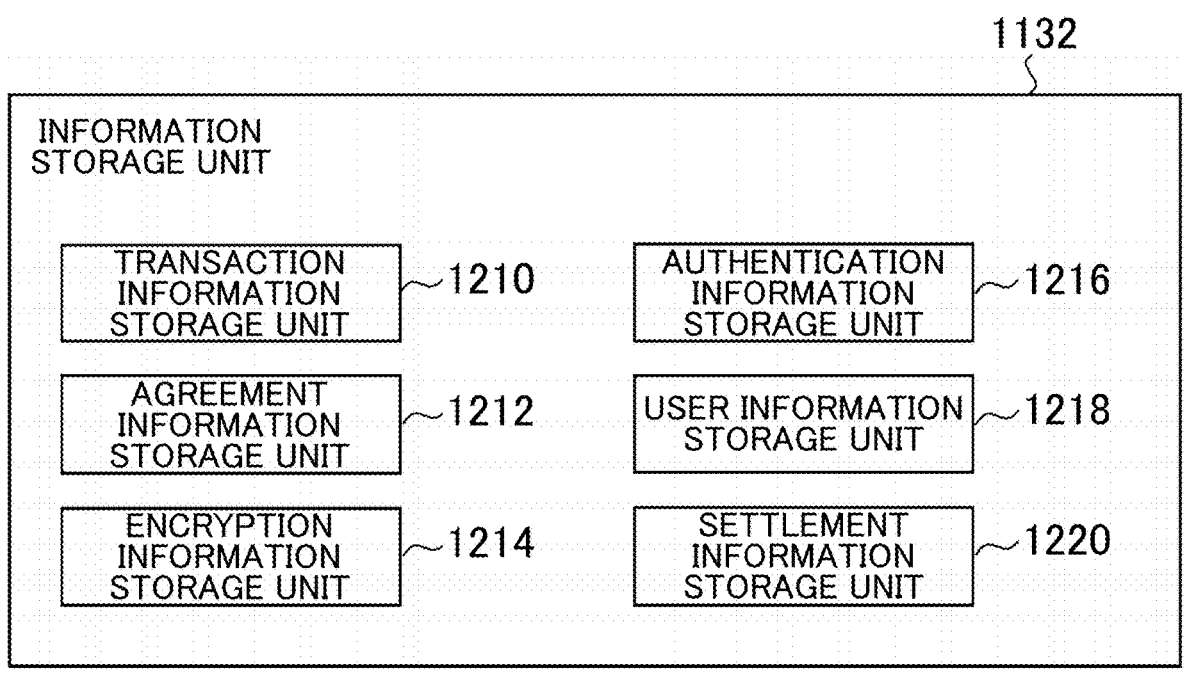
FIG. 12 schematically illustrates one example of an internal configuration of an information storage unit 1132.

FIG. 12 schematically illustrates one example of an internal configuration of an information storage unit 1132. In the present embodiment, the information storage unit 1132 includes a transaction information storage unit 1210, an agreement information storage unit 1212, an encryption information storage unit 1214, an authentication information storage unit 1216, a user information storage unit 1218, and a settlement information storage unit 1220.

The transaction information storage unit 1210 stores the transaction information acquired by the communication control unit 1110. The agreement information storage unit 1212 stores the agreement information generated by the matching unit 1120. The encryption information storage unit 1214 stores an encryption key to be used for an encryption process in the encryption unit 1122. The encryption information storage unit 1214 stores a decryption key to be used for a decryption process in the decryption unit 1130. For example, the encryption information storage unit 1214 stores the first decryption key and the second decryption key described above. The authentication information storage unit 1216 stores in advance: (a) at least one of the identification information of the control box 230 and the identification information of the current sensor 330; and (b) the authentication information, such that they are associated with one another. The user information storage unit 1218 stores information about each user. The settlement information storage unit 1220 stores information indicating charges of the power involved with the transaction.

While the embodiments of the present invention have been described, the technical scope of the invention is not limited to the above described embodiments. It is apparent to persons skilled in the art that various alterations and improvements can be added to the above-described embodiments. Also, unless a technical contradiction occurs, the matters described in the particular embodiment can be applied to another embodiment. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A transaction management system comprising a transaction management apparatus that manages a power transaction between a power feeding side and a power receiving side, wherein
the transaction management apparatus includes:
a transaction information acquiring unit that acquires transaction information in which: (a) power feeding side identification information for identifying the power feeding side; (b) power receiving side identification information for identifying the power receiving side; and (c) power feeding information about a power amount fed from a device in the power feeding side or a power amount fed to a device in the power receiving side are associated with one another, from at least one of: (i) a power feeding management apparatus that manages a power feeding from the power feeding side to the power receiving side; (ii) the device in the power feeding side, (iii) a user's communication terminal in the power feeding side, (iv) the device in the power receiving side, and (v) a user's communication terminal in the power receiving side, via a communication network;
a transaction information storage unit that stores the transaction information acquired by the transaction information acquiring unit;
an authentication information acquiring unit that acquires information in which (a) at least one of: measuring unit identification information and power feeding management apparatus identification information is associated with (b) authentication information, from at least one of: (i) the power feeding management apparatus; (ii) the device in the power feeding side, (iii) the user's communication terminal in the power feeding side, (iv) the device in the power receiving side, and (v) the user's communication terminal in the power receiving side, via the communication network, the measuring unit identification information for identifying a measuring unit that measures a physical amount related to a power amount fed from the device in the power feeding side or a power amount fed to the device in the power receiving side, the power feeding management apparatus identification information for identifying the power feeding management apparatus, and the authentication information including at least one of characteristic information indicating a characteristic of the measuring unit and a passphrase used for authentication of the measuring unit or the power feeding management apparatus;
an authentication information storage unit that stores in association and in advance (a) at least one of the measuring unit identification information and the power feeding management apparatus identification information and (b) the authentication information; and
a power feeding management apparatus authentication unit that verifies the authentication information acquired by the authentication information acquiring unit with the authentication information stored in the authentication information storage unit in advance, and that authenticates the measuring unit or the power feeding management apparatus if the acquired authentication information matches the stored authentication information, wherein
the transaction management system further comprises a power feeding management apparatus that manages a power feeding from the power feeding side to the power receiving side,
the power feeding management apparatus includes a communication monitoring unit that monitors a communication situation of a communication between the power feeding side and the power receiving side, and
the communication monitoring unit acquires information about a scheduled ending time of charging, and adjusts a time interval for monitoring the communication situation such that a time interval in a first time period is longer than a time interval in a second time period which is closer to the scheduled ending time of charging than the first time period.

2. The transaction management system according to claim 1,
wherein the power feeding management apparatus includes:
a power feeding side identification information acquiring unit that acquires the power feeding side identification information from a device in the power feeding side or a user's communication terminal in the power feeding side;
a power receiving side identification information acquiring unit that acquires the power receiving side identification information from a device in the power receiving side or a user's communication terminal in the power receiving side;
a power feeding information acquiring unit that acquires the power feeding information; and
a transmission unit that associates with one another and transmits to the transaction management apparatus: the power feeding side identification information acquired by the power feeding side identification information acquiring unit; the power receiving side identification information acquired by the power receiving side identification information acquiring unit; and the power feeding information acquired by the power feeding information acquiring unit.

3. The transaction management system according to claim 2, wherein
(i) the power feeding management apparatus is provided as a part of a charging equipment that transmits an electric energy between the device in the power feeding side and the device in the power receiving side; or
(ii) at least one part of the power feeding management apparatus is provided inside an adaptor arranged between the charging equipment and the device in the power feeding side or the device in the power receiving side.

4. The transaction management system according to claim 1, wherein
the transaction information acquiring unit acquires first transaction information in which the power feeding side identification information is associated with the power feeding information, from the device in the power feeding side or the user's communication terminal in the power feeding side via the communication network, and acquires second transaction information in which the power receiving side identification information is associated with the power feeding information, from the device in the power receiving side or the user's communication terminal in the power receiving side via the communication network, and
the transaction management apparatus further includes a comparison unit that compares a power amount indicated by the first transaction information with a power amount indicated by the second transaction information.

5. The transaction management system according to claim 1, wherein the transaction management apparatus further includes an encryption unit that encrypts at least one of the power feeding side identification information and the power receiving side identification information by using a third encryption key that corresponds to a third decryption key stored in the power feeding management apparatus.

6. The transaction management system according to claim 1, wherein
the authentication information is encrypted, and
the transaction management apparatus includes:
a first decryption key storage unit that stores a first decryption key corresponding to a first encryption key used for encrypting the authentication information; and
a first decryption unit that decrypts the encrypted authentication information by using the first decryption key stored in the first decryption key storage unit.

7. The transaction management system according to claim 1, wherein
the transaction information is encrypted, and
the transaction management apparatus includes:
a second decryption key storage unit that stores a second decryption key corresponding to a second encryption key used for encrypting the transaction information; and
a second decryption unit that decrypts the encrypted transaction information by using the second decryption key stored in the second decryption key storage unit.

8. The transaction management system according to claim 1, wherein the transaction management apparatus further includes a settlement unit that settles a charge of the power transaction.

9. A non-transitory computer readable medium storing thereon a program for causing a computer to function as a power feeding management apparatus by performing operations comprising:
a transaction information acquiring step of acquiring, by the computer, transaction information in which: (a) power feeding side identification information for identifying the power feeding side; (b) power receiving side identification information for identifying the power receiving side; and (c) power feeding information about a power amount fed from a device in the power feeding side or a power amount fed to a device in the power receiving side are associated with one another, from at least one of: (i) the power feeding management apparatus that manages a power feeding from the power feeding side to the power receiving side; (ii) the device in the power feeding side, (iii) a user's communication terminal in the power feeding side, (iv) the device in the power receiving side, and (v) a user's communication terminal in the power receiving side, via a communication network;
a transaction information storage step of storing, by the computer, the transaction information acquired in the transaction information acquiring step
an authentication information acquiring step of acquiring, by the computer, information in which (a) at least one of: measuring unit identification information and power feeding management apparatus identification information is associated with (b) authentication information, from at least one of: (i) the power feeding management apparatus; (ii) the device in the power feeding side, (iii) the user's communication terminal in the power feeding side, (iv) the device in the power receiving side, and (v) the user's communication terminal in the power receiving side, via the communication network, the measuring unit identification information for identifying a measuring unit that measures a physical amount related to a power amount fed from the device in the power feeding side or a power amount fed to the device in the power receiving side, the power feeding management apparatus identification information for identifying the power feeding management apparatus, and the authentication information including at least one of characteristic information indicating a characteristic of the measuring unit and a passphrase used for authentication of the measuring unit or the power feeding management apparatus;
an authentication information storage step of storing, by the computer, in association and in advance (a) at least one of the measuring unit identification information and the power feeding management apparatus identification information and (b) the authentication information; and
a power feeding management apparatus authentication step of verifying, by the computer, the authentication information acquired in the authentication information acquiring step with the authentication information stored in the authentication information storage step in advance, and that authenticates the measuring unit or the power feeding management apparatus if the acquired authentication information matches the stored authentication information; and
a communication monitoring step of monitoring a communication situation of a communication between the power feeding side and the power receiving side, including (i) acquiring information about a scheduled ending time of charging, and (ii)

adjusting a time interval for monitoring the communication situation such that a time interval in a first time period is longer than a time interval in a second time period which is closer to the scheduled ending time of charging than the first time period.

10. A transaction management method for managing a power transaction between a power feeding side and a power receiving side by using a computer, the transaction management method comprising:
   a transaction information acquiring step of acquiring, by the computer, transaction information in which: (a) power feeding side identification information for identifying the power feeding side; (b) power receiving side identification information for identifying the power receiving side; and (c) power feeding information about a power amount fed from a device in the power feeding side or a power amount fed to a device in the power receiving side are associated with one another, from at least one of: (i) a power feeding management apparatus that manages a power feeding from the power feeding side to the power receiving side; (ii) the device in the power feeding side, (iii) a user's communication terminal in the power feeding side, (iv) the device in the power receiving side, and (v) a user's communication terminal in the power receiving side, via a communication network;
   a transaction information storage step of storing, by the computer, the transaction information acquired in the transaction information acquiring step
   an authentication information acquiring step of acquiring, by the computer, information in which (a) at least one of: measuring unit identification information and power feeding management apparatus identification information is associated with (b) authentication information, from at least one of: (i) the power feeding management apparatus; (ii) the device in the power feeding side, (iii) the user's communication terminal in the power feeding side, (iv) the device in the power receiving side, and (v) the user's communication terminal in the power receiving side, via the communication network, the measuring unit identification information for identifying a measuring unit that measures a physical amount related to a power amount fed from the device in the power feeding side or a power amount fed to the device in the power receiving side, the power feeding management apparatus identification information for identifying the power feeding management apparatus, and the authentication information including at least one of characteristic information indicating a characteristic of the measuring unit and a passphrase used for authentication of the measuring unit or the power feeding management apparatus;
   an authentication information storage step of storing, by the computer, in association and in advance (a) at least one of the measuring unit identification information and the power feeding management apparatus identification information and (b) the authentication information; and
   a power feeding management apparatus authentication step of verifying, by the computer, the authentication information acquired in the authentication information acquiring step with the authentication information stored in the authentication information storage step in advance, and that authenticates the measuring unit or the power feeding management apparatus if the acquired authentication information matches the stored authentication information; and
   a communication monitoring step of monitoring a communication situation of a communication between the power feeding side and the power receiving side, including (i) acquiring information about a scheduled ending time of charging, and (ii) adjusting a time interval for monitoring the communication situation such that a time interval in a first time period is longer than a time interval in a second time period which is closer to the scheduled ending time of charging than the first time period.

* * * * *